United States Patent
Fukagawa et al.

(10) Patent No.: US 9,090,824 B2
(45) Date of Patent: Jul. 28, 2015

(54) POLARIZING PLATE, METHOD FOR PREPARING THE SAME, AND LIQUID CRYSTAL DISPLAY DEVICE

(71) Applicant: FUJIFILM Corporation, Tokyo (JP)

(72) Inventors: Nobutaka Fukagawa, Kanagawa (JP); Yu Naito, Kanagawa (JP); Akio Tamura, Kanagawa (JP); Yutaka Nozoe, Kanagawa (JP); Hiroshi Inada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 13/749,043

(22) Filed: Jan. 24, 2013

(65) Prior Publication Data

US 2013/0189449 A1    Jul. 25, 2013

(30) Foreign Application Priority Data

Jan. 25, 2012 (JP) .................................. 2012-013576
Nov. 16, 2012 (JP) .................................. 2012-252635

(51) Int. Cl.
*C09K 19/00* (2006.01)
*C09K 19/52* (2006.01)
(Continued)

(52) U.S. Cl.
CPC . *C09K 19/52* (2013.01); *G02B 1/04* (2013.01); *G02B 5/30* (2013.01); *G02B 1/105* (2013.01); *G02B 5/3033* (2013.01); *Y10T 428/105* (2015.01)

(58) Field of Classification Search
CPC ...... G02B 5/30; G02B 5/3033; G02B 5/3041; G02B 1/04; G02B 1/105; C08B 3/18; C08B 3/16; C08B 3/06; C08J 2301/10; C08J 2301/12; C08J 2301/14; G02F 1/133528; Y10T 428/10; Y10T 428/1041; Y10T 428/105

USPC ............... 428/1.1, 1.3, 1.31, 1.33, 1.54, 1.55; 349/96, 117, 118; 359/487.01, 489.01; 106/170.1; 536/58, 64

See application file for complete search history.

(56) References Cited

U.S. PATENT DOCUMENTS

2007/0009676 A1    1/2007    Tamagawa et al.
2011/0134374 A1    6/2011    Fukagawa et al.
(Continued)

FOREIGN PATENT DOCUMENTS

JP    H03-045905         2/1991
JP    06-265725 A        9/1994
(Continued)

OTHER PUBLICATIONS

Notice of Reasons for Rejection, issued by Japanese Patent Office on Feb. 10, 2015, in connection with Japanese Patent Application No. 2012-252635.

(Continued)

*Primary Examiner* — Gwendolyn Blackwell
*Assistant Examiner* — Ruiyun Zhang
(74) *Attorney, Agent, or Firm* — Jean C. Edwards, Esq.; Edwards Neils PLLC

(57) ABSTRACT

A polarizing plate includes two protective films and a polarizer provided between the two protective films, and the polarizer has a thickness of 3 μm to 18 μm, at least one of the protective films has a thickness of 3 μm to 40 μm and contains at least one resin and a compound in an amount of 1 part by mass to 20 parts by mass based on 100 parts by mass of the resin, the compound having at least one hydrogen-donating group capable of forming a hydrogen bond and a ratio of molecular weight to number of aromatic rings of 300 or less, and the polarizing plate has a thickness of 15 μm to 70 μm.

4 Claims, 1 Drawing Sheet

(51) Int. Cl.
*G02B 5/30* (2006.01)
*G02B 1/04* (2006.01)
*G02B 1/10* (2015.01)

(56) References Cited

U.S. PATENT DOCUMENTS

| | | |
|---|---|---|
| 2011/0273646 A1 | 11/2011 | Fukagawa et al. |
| 2012/0088041 A1 | 4/2012 | Fukagawa et al. |
| 2013/0189449 A1 | 7/2013 | Fukagawa et al. |
| 2014/0099452 A1* | 4/2014 | Kawanishi et al. .......... 428/1.33 |

FOREIGN PATENT DOCUMENTS

| | | |
|---|---|---|
| JP | 2002-236212 | 8/2002 |
| JP | 2003-165188 A | 6/2003 |
| JP | 2003-207620 | 7/2003 |
| JP | 2004-012578 A | 1/2004 |
| JP | 2005-105066 | 4/2005 |
| JP | 2006-163082 | 6/2006 |
| JP | 2007-047536 A | 2/2007 |
| JP | 2009-037223 | 2/2009 |
| JP | 2009-086362 | 4/2009 |
| JP | 2011-118135 A | 6/2011 |
| JP | 2011-126968 | 6/2011 |
| JP | 2011-237580 A | 11/2011 |
| JP | 2012-014148 | 1/2012 |
| JP | 2012-098698 | 5/2012 |
| WO | 2007/007565 A1 | 1/2007 |
| WO | WO 2009107405 A1 * | 9/2009 |
| WO | WO 2012169629 A1 * | 12/2012 |

OTHER PUBLICATIONS

Office Action issued by the Japanese Patent Office on Jan. 27, 2015, in connection with Japanese Patent Application No. 2014-020395.
Official Action issued by the Japanese Patent Office on Feb. 24, 2015 in connection with Japanese Patent Application No. 2014-020394.

* cited by examiner

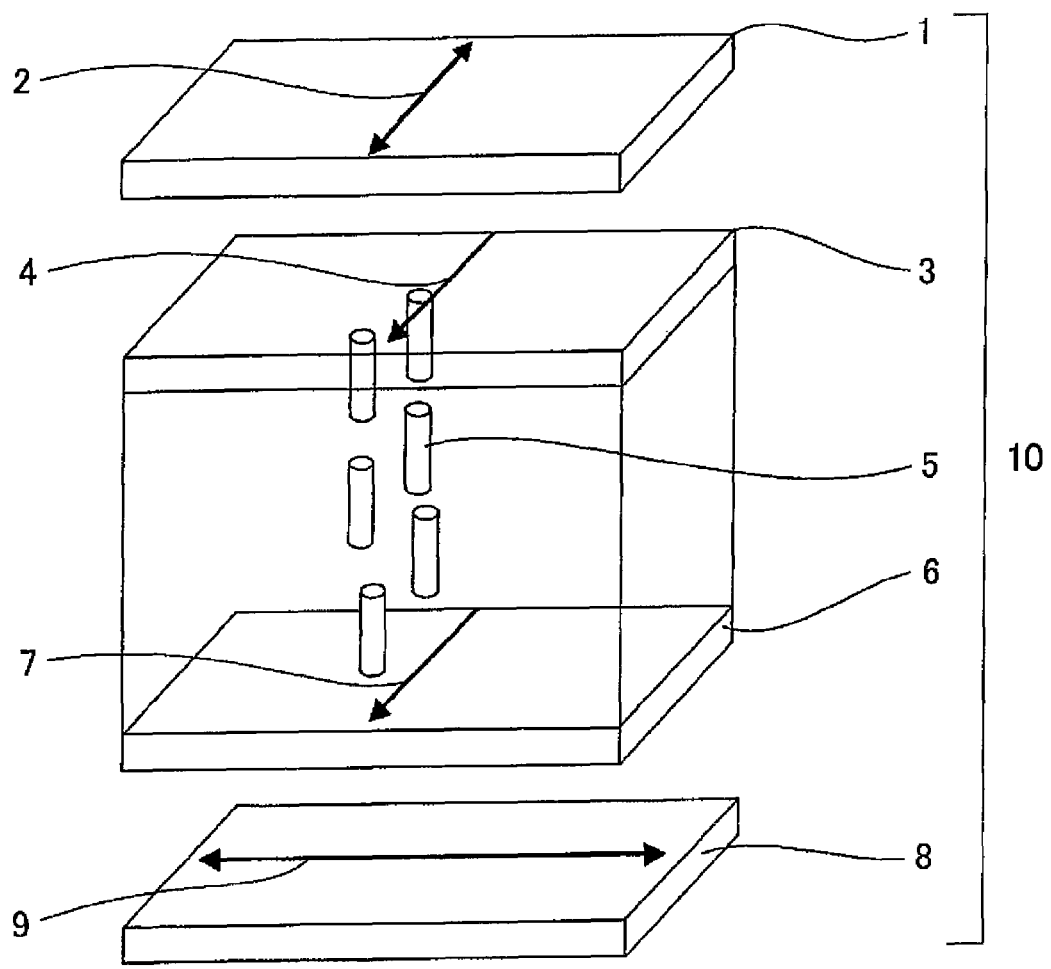

POLARIZING PLATE, METHOD FOR PREPARING THE SAME, AND LIQUID CRYSTAL DISPLAY DEVICE

CROSS-REFERENCE TO RELATED APPLICATIONS AND PRIORITY CLAIMS

This present application claims the benefit of priority from Japanese Patent Applications Nos. 2012-013576, which was filed Jan. 25, 2012, and 2012-252635, which was filed Nov. 16, 2012, the contents of all of which are incorporated herein by reference in their entirety.

FIELD OF THE INVENTION

The present invention relates to a polarizing plate, a method for preparing the same and a liquid crystal display device. In particular, the present invention relates to a polarizing plate having excellent polarizer durability and small curling even in high temperature and high humidity environments, in which the warping or distortion of a liquid crystal panel hardly occurs, which is caused by the usage environment when incorporated in a liquid crystal display device, and display unevenness resulting from the warping or distortion is also difficult to occur, and a liquid crystal display device.

BACKGROUND OF THE INVENTION

The liquid crystal display device is a space-saving image display device with low power consumption, and the use thereof is increasing every year. In addition to the market, for example, for TVs and the like where high-quality images are required, there is higher need for thinning as markets for so-called mobile use, such as mobile phones and tablet PCs are expanded.

The basic configuration of a liquid crystal display device is that polarizing plates are disposed on both sides of a liquid crystal cell. The polarizing plate serves to transmit only a light of a plane of polarization in a specific direction, and the performance of the liquid crystal display device greatly depends on the performance of the polarizing plate. The polarizing plate generally has a configuration including a polarizer composed of a polyvinyl alcohol film and the like, on which iodine or a dye is adsorbed and oriented, and transparent protective films bonded to inner and outer sides of the polarizer. A cellulose acylate-based polarizing plate protective film, typified by cellulose acetate, has high transparency and readily secures adhesion to polyvinyl alcohol used in the polarizer, and thus, has been widely used as a polarizing plate protective film.

As the liquid crystal display devices become thinner, gaps between a liquid crystal panel and a backlight unit become narrower, and thus, the level required for dimensional stability of each member has been further rigorous. Even for the polarizing plate, it is required that the polarizing plate itself becomes thinner and curling or change in dimension of the polarizing plate is decreased. In particular, the contraction of the polarizing plate under high temperature and high humidity environments is responsible for warping or distortion of a panel, which causes the display to become uneven, and thus, the improvement thereof has been strongly required.

To solve the problem, Japanese Patent Application Laid-Open No. 2007-47536 and International Publication WO 0717565 disclose a method for reducing display unevenness by thinning a polarizing film and a polarizing plate protective film to decrease stress in a liquid crystal panel caused by contraction of the entire polarizing plate.

SUMMARY OF THE INVENTION

However, the present inventors have studied and found out that the polarizing plates described in Japanese Patent Application Laid-Open No. 2007-47536 and International Publication WO 07/7565 exhibit a certain effect of the polarizing plate on reducing display unevenness, but the display quality significantly deteriorates when the polarizing plate is used under high temperature and high humidity environments for a long time.

The present inventors have investigated the polarization performance of the polarizing plates described in Japanese Patent Application Laid-Open No. 2007-47536 and International Publication WO 07/7565 under conditions of 60° C., 95% relative humidity (RH) and time passage, and found out that the crossed transmittance thereof has been significantly reduced.

That is, there has not been known so far a polarizing plate, which has improved polarizer durability under high temperature and high humidity and reduced unevenness in the vicinity when the polarizing plate is incorporated in a liquid crystal display device, and thus, improvement thereof is required.

An object of the present invention is to provide a polarizing plate having excellent polarizer durability and small curling even in high temperature and high humidity environments, in which the warping or distortion of a liquid crystal panel hardly occurs, which is caused by usage environment when incorporated in a liquid crystal display device, and display unevenness resulting from the warping or distortion is difficult to occur, and a liquid crystal display device.

In order to solve the above-described problem, the present inventors have intensively studied, and found out that even in a polarizing plate protective film having a predetermined water vapor permeability, it is possible to suppress the reduction in content of boric acid in a polarizer with lapse of time at high temperature and high humidity by allowing the polarizing plate protective film to contain an additive having at least one hydrogen-donating group capable of forming a hydrogen bond and having a ratio of molecular weight to number of aromatic rings of 300 or less in an amount of 1 part by mass to 20 parts by mass based on a resin.

That is, the above-described problem is solved by the following configuration.

1. A polarizing plate comprising: a polarizer; and two polarizing plate protective films disposed on both sides of the polarizer (A polarizing plate comprising: two polarizing plate protective films; and a polarizer provided between the two protective films), wherein (1) the polarizer has a thickness of 3 μm to 18 μm, (2) at least one of the polarizing plate protective films has a thickness of 3 μm to 40 μm and contains at least one resin and a compound having at least one hydrogen-donating group capable of forming a hydrogen bond and a ratio of molecular weight to number of aromatic rings of 300 or less in an amount of 1 part by mass to 20 parts by mass based on 100 parts by mass of the resin, and (3) the polarizing plate has a thickness of 15 μm to 70 μm.

2. The polarizing plate of the above-mentioned 1, wherein the compound having at least one hydrogen-donating group capable of forming a hydrogen bond and having a ratio of molecular weight to number of aromatic rings of 300 or less is a compound represented by the following Formula (1).

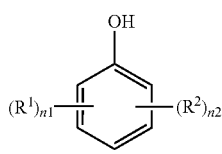

(1)

In Formula (1), $R^1$ represents a hydrogen atom or a substituent, and $R^2$ represents a substituent represented by the following Formula (1-2); n1 represents an integer of 0 to 4, and each $R^1$ is the same as or different from every other $R^1$ when n1 is 2 or higher; and n2 represents an integer of 1 to 5, and each $R^2$ is the same as or different from every other $R^2$ when n2 is 2 or higher.

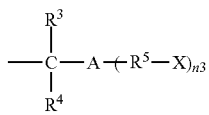

(1-2)

In Formula (1-2), A represents a substituted or unsubstituted aromatic ring; each of $R^3$ and $R^4$ independently represents a hydrogen atom, an alkyl group having 1 to 5 carbon atoms or a substituent represented by the following Formula (1-3); $R^5$ represents a single bond or an alkylene group having 1 to 5 carbon atoms; X represents a substituted or unsubstituted aromatic ring; and n3 represents an integer of 0 to 10, and each of $R^5$ and X is the same as or different from every other $R^5$ and X when n3 is 2 or higher.

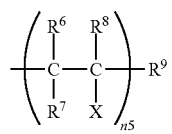

(1-3)

In Formula (1-3), X represents a substituted or unsubstituted aromatic ring; each of $R^6$, $R^7$, $R^8$ and $R^9$ independently represents a hydrogen atom or an alkyl group having 1 to 5 carbon atoms; and n5 represents an integer of 1 to 11, and each of $R^6$, $R^7$, $R^8$ and $R^9$ and X is the same as or different from every other $R^6$, $R^7$, $R^8$ and $R^9$ and X when n5 is 2 or higher.

3. The polarizing plate of the above-mentioned 2, wherein the Formula (1-2) is a group represented by the following Formula (1-2').

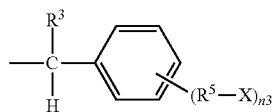

(1-2')

In Formula (1-2'), $R^3$ represents a hydrogen atom, an alkyl group having 1 to 5 carbon atoms or a substituent represented by the Formula (1-3); $R^5$ represents a single bond or an alkylene group having 1 to 5 carbon atoms; X represents a substituted or unsubstituted aromatic ring; and n3 represents an integer of 0 to 5, and each of $R^5$ and X is the same as or different from every other $R^5$ and X when n3 is 2 or higher.

4. The polarizing plate of the above-mentioned 1, wherein the compound having at least one hydrogen-donating group capable of forming a hydrogen bond and a ratio of molecular weight to number of aromatic rings of 300 or less is a compound represented by the following Formula (2).

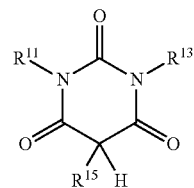

(2)

In Formula (2), each of $R^{11}$, $R^{13}$ and $R^{15}$ independently represents a hydrogen atom, an alkyl group having 1 to 20 carbon atoms, a cycloalkyl group having 3 to 20 carbon atoms, an alkenyl group having 2 to 20 carbon atoms or an aromatic group having 6 to 20 carbon atoms.

5. The polarizing plate of any one of the above-mentioned 1 to 4, wherein a resin constituting the polarizing plate protective film is cellulose acylate.

6. The polarizing plate of any one of the above-mentioned 1 to 5, wherein one of two polarizing plate protective films is said polarizing plate protective film, and a resin constituting other of the two polarizing plate protective films is an acrylic resin.

7. A liquid crystal display device comprising at least one polarizing plate of any one of the above-mentioned 1 to 6.

According to the present invention, it is possible to provide a polarizing plate having excellent polarizer durability and small curling even in high temperature and high humidity environments, in which the warping or distortion of a liquid crystal panel hardly occurs, which is caused by usage environment when incorporated in a liquid crystal display device, and display unevenness resulting from the warping or distortion is difficult to occur, and a liquid crystal display device.

BRIEF DESCRIPTION OF THE DRAWINGS

FIG. 1 is a schematic view illustrating an example of a liquid crystal display device of the present invention.

DETAILED DESCRIPTION OF THE INVENTION

[Polarizing Plate]

The polarizing plate of the present invention includes a polarizer and two polarizing plate protective films disposed on both sides of the polarizer (The polarizing plate of the present invention includes two polarizing plate protective films and a polarizer provided between the two protective films), (1) the polarizer has a thickness of 3 μm to 18 μm, (2) at least one of the polarizing plate protective films has a thickness of 3 μm to 40 μm and contains a resin and an additive having at least one hydrogen-donating group capable of forming a hydrogen bond and a ratio of molecular weight to number of aromatic rings of 300 or less in an amount of 1 part by mass to 20 parts by mass based on 100 parts by mass of the resin, and (3) the polarizing plate has a thickness of 15 μm to 70 μm.

For the conventional polarizing plats, the content of boric acid in a polarizer is reduced over time and a complex of a hydrophilic polymer (for example, polyvinyl alcohol) and a dichroic pigment (for example, iodine) becomes unstable in many cases, which is responsible for the deterioration of polarization performance thereof. In contrast, for the polarizing plate of the present invention, the reduction in content of boric acid in a polarizer is suppressed by allowing a polarizing protective film to contain an additive having at least one hydrogen-donating group capable of forming a hydrogen bond and having a ratio of molecular weight to number of aromatic rings of 300 or less in an amount of 1 part by mass to 20 parts by mass based on 100 parts by mass of a resin, and simultaneously, an iodine complex is stabilized by allowing the additive to be present throughout at the interface of the polarizer and the polarizing plate protective film under high temperature and high humidity over time.

Hereinafter, the polarizing plate of the present invention will be described in detail.

<Performance Of Polarizing Plate>

(Crossed Transmittance CT)

The polarizing plate of the present invention has a crossed transmittance CT of preferably CT≤2.0, more preferably CT≤1.3, and most preferably CT≤0.6 (all the units are %).

(Change in Crossed Transmittance)

Further, it is preferred that the variation of crossed transmittance before and after a polarizing plate durability test is small.

It is preferred that the variation (%) of crossed single plate transmittance is 0.65% or less when the polarizing plate of the present invention is allowed to stand at 60° C. and 95% RH for 1,000 hours, and the variation (%) of crossed single plate transmittance is 0.05% or less when the polarizing plate is allowed to stand at 105° C. under dry environments (a non-humidity-controlled state; 0% to 20% RH in the Examples of the present invention) for 50 hours.

When the polarizing plate is allowed to stand at 60° C. and 95% RH for 1,000 hours, the variation (%) of crossed single plate transmittance is preferably 0.30% or less, and more preferably 0.20% or less. Meanwhile, the variation (%) of crossed single plate transmittance is more preferably 0.03% or less when the polarizing plate is allowed to stand at 105° C. under dry environments for 50 hours.

Here, the variation of crossed transmittance is calculated by the following equation.

$$\text{Variation of crossed transmittance (\%)} = \{(\text{Crossed transmittance after durability test (\%)} - \text{Crossed transmittance before durability test (\%)})\}$$

If the variation of crossed transmittance satisfies the above-described range, the polarizing plate may be used under high temperature and high humidity and under high temperature and low humidity for an extended period of time or stability during the storage may be secured.

In the present invention, the crossed transmittance CT of the polarizing plate is measured by using UV3100PC (manufactured by Shimadzu Corporation). The measurement is performed at 410 nm, and the average value of values measured 10 times is used.

Here, the polarizing plate durability test may be performed in two forms, that is, (1) a form in which there is only a polarizing plate and (2) a form in which a polarizing plate is attached to glass through an adhesive, as follows. In the measurement of (1) the polarizing plate only, two polarizing plates are prepared and combined such that a polarizing plate protective film satisfying the requirements of the present invention is sandwiched between two polarizers to allow the absorption axes thereof to be orthogonal to each other. In the measurement of the form (2) in which the polarizing plate is attached to glass by an adhesive, two samples (about 5 cm×5 cm) are prepared, in which a polarizing plate is attached on glass such that a polarizing plate protective film satisfying the requirements of the present invention is on the glass side. The single plate crossed transmittance is measured by setting the film side of the sample to direct at a light source. Each of the two samples is measured, and the average value thereof is defined as the single plate crossed transmittance. In Examples of the present invention, the test method of (2) is adopted between the test methods of (1) and (2).

(Other Characteristics)

Other preferred optical characteristics and the like of the polarizing plate of the present invention are described in [0238] to [0255] of Japanese Patent Application Laid-Open No. 2007-086748, and it is preferred to satisfy these characteristics.

<Shape and Configuration>

For the shape of the polarizing plate of the present invention, a polarizing plate may have an aspect of a film piece cut into a size capable of being incorporated in a liquid crystal display device as it is, and a polarizing plate may have an aspect in which the polarizing plate is prepared to have a long shape by continuous production, and is wound up in a roll shape (for example, an aspect of a roll length of 2,500 m or more or 3,900 m or more). In order to prepare a polarizing plate for a large screen liquid crystal display device, the width of the polarizing plate is preferably 1,470 mm or more.

The polarizing plate of the present invention is formed with a polarizer and polarizing plate protective films protecting both sides thereof, but it is also preferred that a protective film is attached on one side of the polarizing plate and a separate film is attached on the other side.

Both the protective film and the separate film are used for the purpose of protecting the polarizing plate during shipment of the polarizing plate, inspection of the product or the like. In this case, the protective film is attached for the purpose of protecting the surface of the polarizing plate, and is used on the opposite side of the surface of the polarizing plate attached to a liquid crystal panel. Further, the separate film is used for the purpose of covering an adhesion layer which is attached to the liquid crystal panel, and used on the side of a surface of the polarizing plate attached to the liquid crystal panel.

Hereinafter, details on a polarizer and two polarizing plate protective films which may be used in the polarizing plate of the present invention will be described.

<Polarizer>

First, a polarizer used in the polarizing plate of the present invention will be described.

While the polarizer which may be used in the polarizing plate of the present invention is preferably made from polyvinyl alcohol (PVA) and a dichroic molecule, a polyvinylene-based polarizer may also be used, in which a polyene structure is produced by dehydrating and dechlorinating PVA or polyvinyl chloride and oriented as described in Japanese Patent Application Laid-Open No. H11-248937.

(1-1) PVA

The PVA is preferably a polymer material obtained by saponifying polyvinyl acetate, and may contain an ingredient that may be copolymerized with vinyl acetate, such as, for example, an unsaturated carboxylic acid, an unsaturated sulfonic acid, olefins or vinyl ethers. In addition, a modified PVA containing an acetoacetyl group, a sulfonic acid group, a carboxyl group, an oxyalkylene group or the like may also be used.

Otherwise, also preferably available for the polarizing plate of the present invention is a PVA film containing 1,2-glycol bonds in an amount of 1.5% by mole or less as described in Japanese Patent No. 3021494, a PVA film containing optical foreign objects having a size of 5 μm or more by 500 or less per 100 cm² as described in Japanese Patent Application Laid-Open No. 2001-316492, a PVA film showing an unevenness in hot-water cutting temperature of 1.5° C. or lower in the TD direction of the film as described in Japanese Patent Application Laid-Open No. 2002-030163, or a PVA film formed from a solution prepared by mixing 1% by mass to 100% by mass of trivalent to hexavalent polyhydric alcohol such as glycerin and the like or a solution prepared by mixing 15% by mass or more of a plasticizer as described in Japanese Patent Application Laid-Open No. H06-289225.

(1-2) Dichroic Molecule

Higher iodine ions such as $I_3{-}$, $I_5{-}$ or the like, or a dichroic dye may be preferably used for the dichroic molecule.

The higher iodine ions are particularly preferably used in the present invention. The higher iodine ions may be produced by immersing PVA in a solution that is prepared by dissolving iodine in an aqueous solution of potassium iodide and/or an aqueous solution of boric acid and allowing iodine to be adsorbed and oriented by the PVA as described in "Applications of Polarizing Plates", edited by Ryo Nagata, CMC Publishing Co., Ltd. or "Industrial Materials", Vol 28, No. 7, pp. 39 to 45.

When a dichroic dye is used as the dichroic molecule, an azo-based pigment is preferred and bisazo-based and trisazo-based pigments are particularly preferred. The dichroic dye is preferably water soluble, and for this reason, a hydrophilic substituent such as a sulfonic acid group, an amino group, a hydroxyl group or the like is introduced into a dichroic molecule, and preferably used as a free acid or an alkali metal salt, an ammonium salt and an amine salt. Specific examples of the dichroic dyes include those described in Japanese Patent Application Laid-Open No. 2007-086748.

(1-3) Boric Acid

The polarizing plate of the present invention preferably contains boric acid as a crosslinking agent in the polarizer. The stability of a complex formed of a dichroic molecule and PVA by crosslinking the polarizer with boric acid is improved, and thus the deterioration of polarization performance in high temperature and high humidity conditions may be suppressed. The content rate of boric acid in the polarizer of the polarizing plate of the present invention is preferably 1 part by mass to 100 parts by mass based on 100 parts by mass of the polarizer and preferably 5 parts by mass to 50 parts by mass. A polarizer which is well-balanced in color tone may be prepared by controlling the content rate of boric acid within the range.

In the polarizing plate of the present invention, a reduction rate of boric acid in the polarizer before and after a period of 1,000 hours at 60° C. and 95% RH is preferably 50% or less. The reduction rate of boric acid is preferably 40% or less and more preferably 30% or less.

(1-5) Thickness of Polarizer

The thickness of the polarizer before stretching is not particularly limited, but is preferably 1 μm to 1 mm, and particularly preferably 10 μm to 200 μm from the viewpoint of the stability of film maintenance and the uniformity of stretching. Furthermore, a thin PVA film with 10 N or less of stress generated in the stretching in water at a ratio of 4 times to 6 times may be used as described in Japanese Patent Application Laid-Open No. 2002-236212.

The thickness of the polarizer of the present invention is 3 μm to 18 μm. The thickness is more preferably 3 μm to 15 μm, and most preferably 3 μm to 10 μm. The warping or distortion of a liquid crystal panel caused by environmental humidity may be decreased by controlling the thickness of the polarizer within the above-described range.

(1-6) Thickness of Polarizing Plate

The polarizing plate of the present invention has a thickness 15 μm to 70 μm. The thickness is preferably 15 μm to 60 μm, and more preferably 15 μm to 50 μm. The warping or distortion of a liquid crystal panel caused by environmental humidity may be decreased by controlling the thickness of the polarizing plate within the range.

<Polarizing Plate Protective Film>

Subsequently, two polarizing plate protective films used in the polarizing plate of the present invention will be described.

(Thickness of Polarizing Plate Protective Film)

The thickness of the polarizing plate protective film is preferably 3 μm to 40 μm, more preferably 3 μm to 30 μm, and particularly preferably 3 μm to 20 μm.

Here, the two polarizing plate protective films used in the polarizing plate of the present invention may be the same as or different from each other.

When the two polarizing plate protective films of the present invention have different values in water vapor permeability, it is preferred that the polarizing plate protective film far from the liquid crystal cell has a higher water vapor permeability than the polarizing plate protective film close to the liquid crystal cell from the viewpoint of suppressing the warping or distortion of a liquid crystal display device and unevenness in the vicinity resulting from the warping or distortion.

In the case of only one polarizing plate protective film satisfying the characteristic of (2), it is possible to use a film having a value of water vapor permeability after a period of 24 hours at 60° C. and 90% RH, which is balanced with the polarizing plate protective film containing the organic acid, as a polarizing plate protective film which does not satisfy the characteristics of (1) and (2).

Further, in consideration of water content rate, elastic modulus and the like, it is preferred to select other polarizing plate protective films.

As the polarizing plate protective film which does not satisfy the characteristics of (1) and (2), a commercially available cellulose triacetate film (FUJITAC TD80UF, manufactured by Fujifilm Corporation), an alicyclic structure-containing polymer resin film described in Japanese Patent Application Laid-Open No. 2006-58322, an acrylic resin described in Japanese Patent Application Laid-Open No. 2009-122644 and the like may be preferably used.

Hereinafter, a resin used in the polarizing plate protective film and an additive will be described.

(2-2) Resin

The polarizing plate protective film according to the present invention is preferably a film-type resin. The resin used in the polarizing plate protective film will be described.

As the resin used in the polarizing plate protective film, a known resin may be used, and there is no particular limitation as long as the resin does not depart from the spirit of the present invention. Examples of the resin include a cellulose acylate resin, an acrylic resin and a cylcoolefin-based resin, and among them, a cellulose acylate resin is preferred. That is, the polarizing plate protective film preferably contains cellulose acylate.

(Cellulose Acylate)

Hereinafter, cellulose acylate which may be used in the present invention will be described in detail.

The degree of substitution of cellulose acylate means the ratio at which the three hydroxyl groups present in the constituting unit ((β)1,4-glycoside bonding glucose) of cellulose are acylated. The degree of substitution (degree of acylation)

may be calculated by measuring the quantity of bonding fatty acids per mass of the constituting unit of cellulose. In the present invention, the degree of substitution of a cellulose body may be calculated by dissolving the cellulose body in a solvent such as deuterium-substituted dimethyl sulfoxide or the like, measuring the $^{13}$C-NMR spectrum thereof, and obtaining the peak intensity ratio of the carbonyl carbon in the acyl group. The remaining hydroxyl group in the cellulose acylate is substituted with any other acyl group than the acyl group that the cellulose acylate itself has, and then the degree of substitution may be obtained through $^{13}$C-NMR measurement. The details of the measurement method are described in Tezuka, et al. (Carbohydrate, Res., 273 (1995) 83 to 91).

The total degree of acyl substitution of cellulose acylate is preferably 2.0 to 2.97, more preferably 2.2 to 2.95, and particularly preferably 2.3 to 2.95. The organic acid used in the present invention has a high effect of improving polarizing plate durability, when used in combination with the cellulose acylate particularly within the range of such a total degree of acyl substitution.

The acyl group in the cellulose acylate which may be used in the present invention is preferably an acetyl group, a propionyl group and a butyryl group, and more preferably an acetyl group.

A mixed fatty acid ester made from two or more kinds of acyl groups may be preferably used as the cellulose acylate in the present invention. Even in this case, the acyl groups are preferably an acetyl group and an acyl group having 3 to 4 carbon atoms. In addition, when a mixed fatty acid ester is used, the degree of substitution of the acetyl group is preferably less than 2.5, and more preferably less than 1.9. Meanwhile, the degree of substitution of the acyl group having 3 to 4 carbon atoms is preferably 0.1 to 1.5, more preferably 0.2 to 1.2, and particularly preferably 0.5 to 1.1.

In the present invention, two types of cellulose acylates having different substituent and/or degree of substitution may be used in combination or as a mixture; or films formed of a plurality of layers composed of different cellulose acylates may be formed by a co-casting method or the like as described below.

Furthermore, the mixed acid ester having a fatty acid acyl group and a substituted or unsubstituted aromatic acyl group, which is described in [0023] to [0038] of Japanese Patent Application Laid-Open No. 2008-20896, may be preferably used in the present invention.

The cellulose acylate used in the present invention has a mass average degree of polymerization of preferably 250 to 800, and more preferably 300 to 600. Further, the cellulose acylate used in the present invention has a number average molecular weight of preferably 70,000 to 230,000, more preferably 75,000 to 230,000, and most preferably 78,000 to 120,000.

The cellulose acylate used in the present invention may be synthesized by using an acid anhydride or an acid chloride as an acylating agent. When the acylating agent is an acid anhydride, an organic acid (for example, acetic acid) or methylene chloride is used as a reaction solvent. In addition, a protic catalyst such as sulfuric acid may be used as a catalyst. When the acylating agent is an acid chloride, a basic compound may be used as the catalyst. A most common synthetic method used on an industrial scale includes esterifying cellulose with a mixed organic acid component containing an organic acid (acetic acid, propionic acid and butyric acid) or an acid anhydride thereof (anhydrous acetic acid, anhydrous propionic acid and anhydrous butyric acid) corresponding to an acetyl group and other acyl group, thereby synthesizing cellulose ester.

In the above method, there are many cases in which cellulose such as cotton linter or wood pulp is activated with an organic acid such as acetic acid and then esterified with a mixed solution of the above-described organic acid component in the presence of a sulfuric acid catalyst. The organic acid anhydride component is generally used in an excessive amount over the amount of the hydroxyl group present in cellulose. In the esterification treatment, hydrolysis reaction (depolymerization reaction) of the cellulose main chain (($\beta$)-1,4-glycoside bond) proceeds along with the esterification reaction. When the hydrolysis reaction of the main chain proceeds, the degree of polymerization of the cellulose ester is lowered, and the physical properties of a cellulose ester film to be prepared deteriorate. Accordingly, it is preferred that the reaction condition such as the reaction temperature is determined in consideration of the degree of polymerization or the molecular weight of the cellulose ester to be obtained.

(2-3) Polarizer Durability Enhancer

At least one polarizing plate protective film which may be used in the polarizing plate of the present invention contains a resin and 1 to 20 parts by mass based on 100 parts by mass of the resin of a compound (polarizer durability enhancer) having at least one hydrogen-donating group capable of forming a hydrogen bond and a ratio of molecular weight to number of aromatic rings of 300 or less. The additive may be used to improve the polarizer durability in the polarizing plate protective film under high temperature and high humidity. Due to effects of the hydrogen-donating group capable of forming a hydrogen bond in the additive, it is easy for the additive to be present throughout the interface of the polarizer and the polarizing plate protective film under high temperature and high humidity, and the aromatic ring in the additive suppresses boric acid in the polarizer from being diffused into the polarizing plate protective film and exiting out of the polarizing plate.

Examples of the hydrogen-donating group capable of forming a hydrogen bond are described in books such as, for example, Introduction to Hydrogen Bonding written by Jeffrey, George A and published by Oxford UP.

Among the polarizer durability enhancers in the present invention, the hydrogen-donating group capable of forming a hydrogen bond is preferably an amino group, an acylamino group, an alkoxycarbonyl amino group, an aryloxycarbonyl amino group, a sulfonyl amino group, a hydroxy group, a mercapto group and a carboxyl group, and more preferably a sulfonyl amino group, an acyl amino group, an amino group and a hydroxyl group, and even more preferably an amino group and a hydroxyl group, from the viewpoint of interaction with a carbonyl group in celluloseacylate.

The ratio of molecular weight to number of aromatic rings in the polarizer durability enhancer of the present invention is 300 or less, preferably 250 or less and more preferably 200 or less.

The polarizer durability may be greatly improved under high temperature and high humidity by maintaining the ratio of number of aromatic rings to molecular weight at 300 or less.

(Molecular Weight)

The molecular weight of the polarizer durability enhancer is preferably 200 to 1,000, more preferably 250 to 800, and particularly preferably 280 to 600. The range is preferred because it is possible to suppress the loss caused by the volatilization of the polarizer durability enhancer during the film formation of the polarizing plate protective film when the molecular weight is equal to or higher than the lower limit in the above-described range, and it is possible to obtain a polarizing plate film having a low haze because the polarizer durability enhancer has good compatibility with cellulose acylate when the molecular weight is equal to or less than the upper limit in the above-described range.

<Compound Represented by Formula (1)>

The polarizer durability enhancer of the present invention is preferably a compound represented by the following Formula (1).

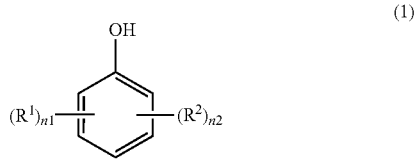

(1)

In Formula (1), $R^1$ represents a hydrogen atom or a substituent, and $R^2$ is a substituent represented by the following Formula (1-2); n1 represents an integer of 0 to 4, and each $R^1$ may be the same as or different from every other $R^1$ when n1 is 2 or higher; and n2 represents an integer of 1 to 5, and each $R^2$ may be the same as or different from every other $R^2$ when n2 is 2 or higher.

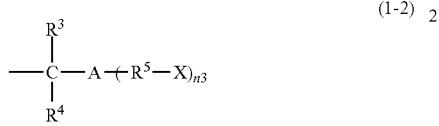

(1-2)

In Formula (1-2), A represents a substituted or unsubstituted aromatic ring; each of $R^3$ and $R^4$ independently represents a hydrogen atom, an alkyl group having 1 to 5 carbon atoms or a substituent represented by the following Formula (1-3); $R^5$ represents a single bond or an alkylene group having 1 to 5 carbon atoms; X represents a substituted or unsubstituted aromatic ring; and n3 represents an integer of 0 to 10, and each of $R^5$ and X may be the same as or different from every other of $R^5$ and X when n3 is 2 or higher.

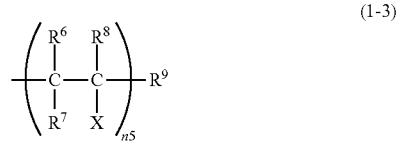

(1-3)

In Formula (1-3), X represents a substituted or unsubstituted aromatic ring; each of $R^6$, $R^7$, $R^8$ and $R^9$ independently represents a hydrogen atom or an alkyl group having 1 to 5 carbon atoms; and n5 represents an integer of 1 to 11, and each of $R^6$, $R^7$, $R^8$ and $R^9$ and X may be the same as or different from every other of $R^6$, $R^7$, $R^8$ and $R^9$ and X when n5 is 2 or higher.

$R^1$ represents a hydrogen atom or a substituent. Examples of the substituent are not particularly limited and include an alkyl group (preferably an alkyl group having 1 to 10 carbon atoms, for example, methyl, ethyl, isopropyl, t-butyl, pentyl, heptyl, 1-ethylpentyl, benzyl, 2-ethoxyethyl, 2-carboxymethyl and the like), an alkenyl group (preferably an alkenyl group having 2 to 20 carbon atoms, for example, vinyl, allyl, oleyl and the like), an alkynyl group (preferably an alkynyl group having 2 to 20 carbon atoms, for example, ethynyl, butadiynyl, phenylethynyl and the like), a cycloalkyl group (preferably a cycloalkyl group having 3 to 20 carbon atoms, for example, cyclopropyl, cyclopentyl, cyclohexyl, 4-methylcyclohexyl and the like), an aryl group (preferably an aryl group having 6 to 26 carbon atoms, for example, phenyl, 1-naphthyl, 4-methoxyphenyl, 2-chlorophenyl, 3-methylphenyl and the like), a heterocyclic ring group (preferably a heterocyclic ring group having 2 to 20 carbon atoms, for example, 2-pyridyl, 4-pyridyl, 2-imidazolyl, 2-benzimidazolyl, 2-thiazolyl, 2-oxazolyl and the like), an alkoxy group (preferably an alkoxy group having 1 to 20 carbon atoms, for example, methoxy, ethoxy, isopropyloxy, benzyloxy and the like), an aryloxy group (preferably an aryloxy group having 6 to 26 carbon atoms, for example, phenoxy, 1-naphthyloxy, 3-methylphenoxy, 4-methoxyphenoxy and the like), an alkoxycarbonyl group (preferably an alkoxycarbonyl group having 2 to 20 carbon atoms, for example, ethoxycarbonyl, 2-ethylhexyloxycarbonyl and the like), an amino group (preferably an amino group having 0 to 20 carbon atoms, for example, amino, N,N-dimethylamino, N,N-diethylamino, N-ethylamino, anilino and the like), a sulfonamide group (preferably a sulfonamide group having 0 to 20 carbon atoms, for example, N,N-dimethyl sulfonamide, N-phenyl sulfonamide and the like), an acyloxy group (preferably an acyloxy group having 1 to 20 carbon atoms, for example, acetyloxy, benzoyloxy and the like), a carbamoyl group (preferably a carbamoyl group having 1 to 20 carbon atoms, for example, N,N-dimethylcarbamoyl, N-phenylcarbamoyl and the like), an acylamino group (preferably an acylamino group having 1 to 20 carbon atoms, for example, acetylamino, benzoylamino and the like), a cyano group or a halogen atom (for example, a fluorine atom, a chlorine atom, a bromine atom, an iodine atom and the like), and a hydroxyl group. $R^1$ is preferably a hydrogen atom, an alkyl group having 1 to 20 carbon atoms and a hydroxyl group, and more preferably a hydrogen atom, a hydroxyl group and a methyl group. Furthermore, $R^1$ may have one or more of the above-mentioned substituents in a substituent.

n1 represents an integer of 0 to 4, and preferably 2 to 4.
n2 represents an integer of 1 to 5, and preferably 1 to 3.
$R^2$ represents a substituent represented by the following Formula (2).

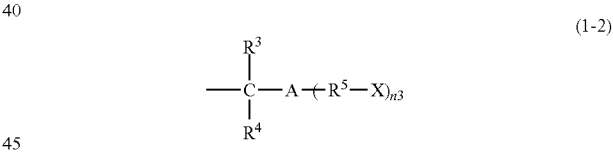

(1-2)

In Formula (1-2), A represents a substituted or unsubstituted aromatic ring; each of $R^3$ and $R^4$ independently represents a hydrogen atom, an alkyl group having 1 to 5 carbon atoms or a substituent represented by the following Formula (1-3); $R^5$ represents a single bond or an alkylene group having 1 to 5 carbon atoms; X represents a substituted or unsubstituted aromatic ring; and n3 represents an integer of 0 to 10, and each of $R^5$ and X may be the same as or different from every other of $R^5$ and X when n3 is 2 or higher.

A represents a substituted or unsubstituted aromatic ring. The aromatic ring may be a heterocyclic ring containing a heteroatom such as a nitrogen atom, an oxygen atom, a sulfur atom and the like. Examples of A include a benzene ring, an indene ring, a naphthalene ring, a fluorene ring, a phenanthrene ring, an anthracene ring, a biphenyl ring, a pyrene ring, a pyran ring, a dioxane ring, a dithiane ring, a thiine ring, a pyridine ring, a piperidine ring, an oxazine ring, a morpholine ring, a thiazine ring, a pyridazine ring, a pyrimidine ring, a pyrazine ring, a piperazine ring, a triazine ring and the like. Further, A may be condensed with another 6- or 5-membered ring. A is preferably a benzene ring. Examples of a substituent which may be possessed by A include a halogen atom (for example, a fluorine atom, a chlorine atom, a bromine atom, an iodine atom and the like), an alkyl group, a hydroxyl group and the like.

Each of $R^3$ and $R^4$ independently represents a hydrogen atom or an alkyl group having 1 to 5 carbon atoms and a substituent represented by the following Formula (1-3). $R^3$ and $R^4$ are preferably a hydrogen atom, an alkyl group having 1 to 3 carbon atoms and a substituent represented by Formula (1-3), and more preferably a hydrogen atom, a methyl group and a substituent represented by Formula (1-3).

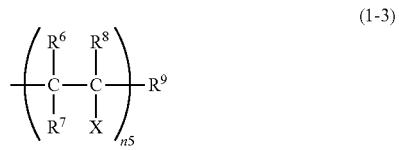

In Formula (1-3), X represents a substituted or unsubstituted aromatic ring; each of $R^6$, $R^7$, $R^8$ and $R^9$ independently represents a hydrogen atom or an alkyl group having 1 to 5 carbon atoms; and n5 represents an integer of 1 to 11, and each of $R^6$, $R^7$, $R^8$ and $R^9$ and X may be the same as or different from every other of $R^6$, $R^7$, $R^8$ and $R^9$ and X when n5 is 2 or higher.

X in Formula (1-3) has the same meaning as X in Formula (1-2), and preferred ranges thereof are also the same.

Each of $R^6$, $R^7$, $R^8$ and $R^9$ independently represents a hydrogen atom or an alkyl group having 1 to 5 carbon atoms. $R^3$ and $R^4$ are preferably a hydrogen atom and an alkyl group having 1 to 3 carbon atoms, and more preferably a hydrogen atom and a methyl group.

n5 represents an integer of 1 to 11, preferably 1 to 9, and more preferably 1 to 7.

Formula (1-3) is preferably represented by the following Formula (1-3').

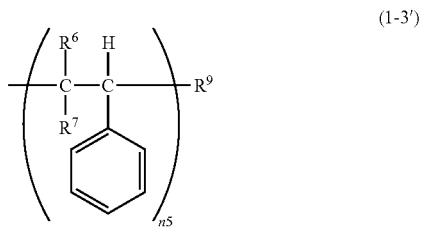

The definition of each symbol in Formula (1-3') has the same meaning as each definition in Formula (1-3), and preferred ranges thereof are also the same.

Formula (1-3) is preferably represented by the following Formula (1-3").

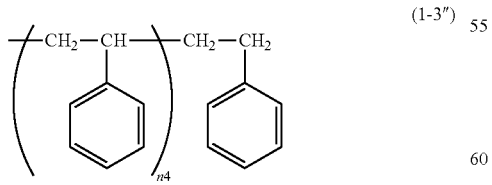

In Formula (3"), n4 represents an integer of 0 to 10.

n4 represents an integer of 0 to 10, preferably 0 to 8, and more preferably 0 to 6.

In Formula (1-2), $R^5$ represents a single bond or an alkylene group having 1 to 5 carbon atoms, and may have a substituent. $R^5$ is preferably an alkylene group having 1 to 4 carbon atoms and more preferably an alkylene group having 1 to 3 carbon atoms. Examples of a substituent that $R^5$ may have include an alkyl group having 1 to 5 carbon atoms (for example, methyl, ethyl, isopropyl and t-butyl), a halogen atom (for example, a fluorine atom, a chlorine atom, a bromine atom, an iodine atom and the like), a hydroxyl group and the like.

In Formula (1-2), X represents a substituted or unsubstituted aromatic ring. The aromatic ring may be a heterocyclic ring containing a heteroatom such as a nitrogen atom, an oxygen atom, a sulfur atom and the like. Examples of X include a benzene ring, an indene ring, a naphthalene ring, a fluorene ring, a phenanthrene ring, an anthracene ring, a biphenyl ring, a pyrene ring, a pyran ring, a dioxane ring, a dithiane ring, a thiine ring, a pyridine ring, a piperidine ring, an oxazine ring, a morpholine ring, a thiazine ring, a pyridazine ring, a pyrimidine ring, a pyrazine ring, a piperazine ring, a triazine ring and the like. In addition, the X may be condensed with another 6- or 5-membered ring. X is preferably a benzene ring. A substituent which may be possessed by X is the same as the substituent exemplified as the substituent of A.

n3 represents an integer of 0 to 10, preferably 0 to 2, and more preferably 0 to 1. Meanwhile, when n3 is an integer of 2 or higher, each group represented by —($R^5$—X) may be the same as or different from every other group, and is each bonded to A.

Formula (1-2) is preferably represented by the following Formula (1-2').

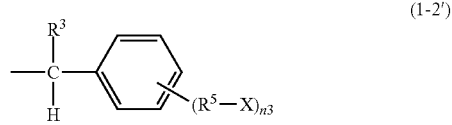

In Formula (1-2'), $R^3$ represents a hydrogen atom, an alkyl group having 1 to 5 carbon atoms or a substituent represented by the Formula (1-3); $R^5$ represents a single bond or an alkylene group having 1 to 5 carbon atoms; X represents a substituted or unsubstituted aromatic ring; and n3 represents an integer of 0 to 5, and each of $R^5$ and X may be the same as or different from every other of $R^5$ and X when n3 is 2 or higher.

A preferred range of each symbol in Formula (1-2') is the same as each range in Formula (1-2).

Formula (1-2) is preferably represented by the following Formula (1-2").

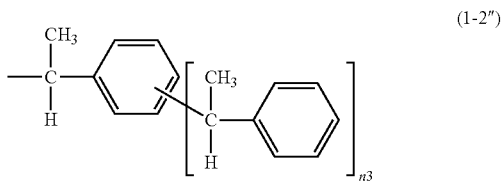

In Formula (1-2"), n3 represents an integer of 0 to 5.

The preferred range of n3 in Formula (1-2") is the same as the preferred range of n3 in Formula (1-2).

The compound represented by Formula (1) preferably has an aspect in which $R^1$ is a hydrogen atom or an alkyl group having 1 to 5 carbon atoms, $R^2$ is represented by Formula (I-2"), n1 represents an integer of 2 to 4, n2 represents an integer of 1 to 3, and n3 represents an integer of 0 to 2.

Hereinafter, specific examples of the compound represented by Formula (1) will be shown, but the present invention is not limited to the following specific examples.

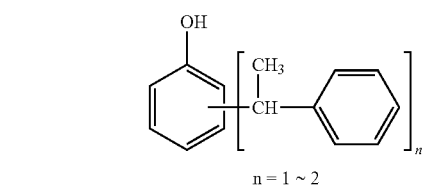
(1-1)

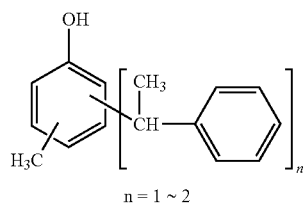
(1-2)

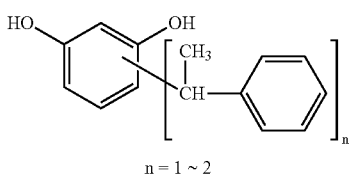
(1-3)

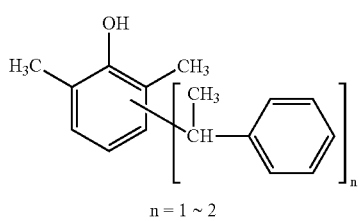
(1-4)

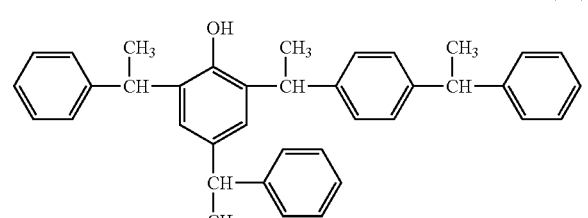
(1-5)

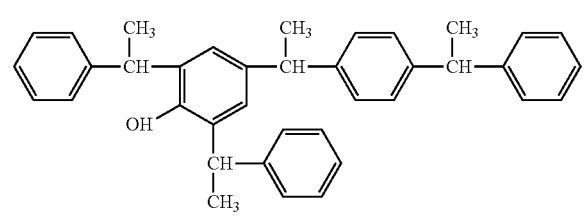
(1-6)

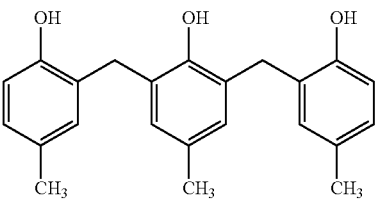
(1-11)

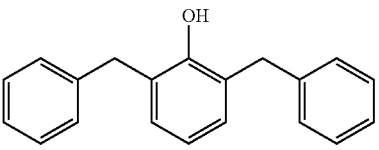
(1-12)

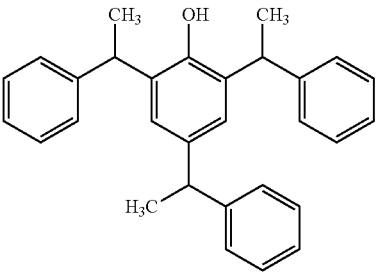
(1-13)

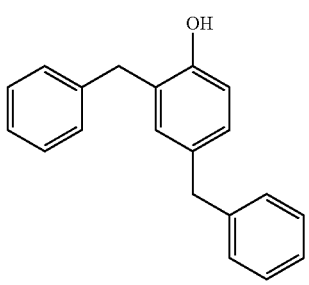
(1-14)

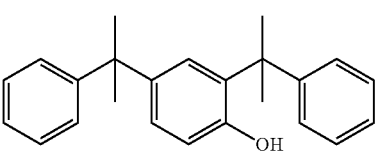
(1-15)

Meanwhile, from the viewpoint that there are a lot of compounds represented by Formula (1), which are different in number of hydroxyl groups, a mixture containing at least two different kinds of compounds represented by Formula (1) may be used in order to enable hydrogen bonding to be achieved. An example thereof includes a mixture of a styrenated phenol having 1 to 3 moles of styrene alkylated to phenol, a styrenated phenol with styrene alkylated on a phenyl moiety of an alkylated styrene and a styrenated phenol with an oligomer, which is a di- to tetramer, of styrene alkylated to phenol.

The compound represented by Formula (1) may be generally synthesized by adding one or more equivalents of styrenes to one equivalent of phenols in the presence of an acid catalyst, and a commercially available product may be used. Furthermore, a mixture obtained by the synthesizing method may be used as it is.

Examples of a commercially available product of the compound represented by Formula (III) include "TSP" which is a styrenated phenol manufactured by SANKO Co., Ltd., "PH-25" manufactured by NITTO CHEMICAL CO., LTD., "NONFLEX WS" manufactured by Seiko Chemical Co., Ltd. and the like.

<Compound Represented by Formula (2)>

The polarizer durability enhancer of the present invention is preferably a compound represented by the following Formula (2).

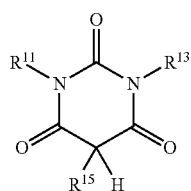

(2)

In Formula (2), each of $R^{11}$, $R^{13}$ and $R^{15}$ independently represents a hydrogen atom, an alkyl group having 1 to 20 carbon atoms, a cycloalkyl group having 3 to 20 carbon atoms, an alkenyl group having 2 to 20 carbon atoms or an aromatic group having 6 to 20 carbon atoms.

The alkyl group having 1 to 20 carbon atoms, which may be used as the above-mentioned $R^{11}$, $R^{13}$ and $R^{15}$, is preferably an alkyl group having 1 to 10 carbon atoms, more preferably 1 to 5 carbon atoms, even more preferably 1 to 3 carbon atoms, and particularly preferably a methyl group or an ethyl group.

The cycloalkyl group having 3 to 20 carbon atoms, which may be used as the above-mentioned $R^{11}$, $R^{13}$ and $R^{15}$, is preferably a cylcoalkyl group having 3 to 10 carbon atoms, and more preferably 4 to 8 carbon atoms. Specific examples of the cycloalkyl group include a cyclopropyl group, a cyclopentyl group and a cyclohexyl group, and particularly preferably a cyclohexyl group.

The alkenyl group having 2 to 20 carbon atoms, which may be used as the above-mentioned $R^{11}$, $R^{13}$ and $R^{15}$, is preferably an alkenyl group having 2 to 10 carbon atoms, and more preferably 2 to 5 carbon atoms.

The aromatic group having 6 to 20 carbon atoms, which may be used as the above-mentioned $R^{11}$, $R^{13}$ and $R^{15}$, may be an aromatic hydrocarbon group or an aromatic heterocyclic group, but is preferably an aromatic hydrocarbon group. The aromatic hydrocarbon is preferably a phenyl group or a naphthyl group, and more preferably a phenyl group.

$R^{11}$, $R^{13}$ and $R^{15}$ may have a substituent, but examples of the substituent are not particularly limited and include an alkyl group (preferably an alkyl group having 1 to 10 carbon atoms, for example, methyl, ethyl, isopropyl, t-butyl, pentyl, heptyl, 1-ethylpentyl, benzyl, 2-ethoxyethyl, 1-carboxymethyl and the like), an alkenyl group (preferably an alkenyl group having 2 to 20 carbon atoms, for example, vinyl, allyl, oleyl and the like), an alkynyl group (preferably an alkynyl group having 2 to 20 carbon atoms, for example, ethynyl, butadiynyl, phenylethynyl and the like), a cycloalkyl group (preferably a cycloalkyl group having 3 to 20 carbon atoms, for example, cyclopropyl, cyclopentyl, cyclohexyl, 4-methylcyclohexyl and the like), an aryl group (preferably an aryl group having 6 to 26 carbon atoms, for example, phenyl, 1-naphthyl, 4-methoxyphenyl, 2-chlorophenyl, 3-methylphenyl and the like), a heterocyclic ring group (preferably a heterocyclic ring group having 0 to 20 carbon atoms, in which the ring constituting heteroatom is preferably an oxygen atom, a nitrogen atom or a sulfur atom, the ring may be condensed with a benzene ring or a heterocyclic ring as a five- or six-membered ring, and the ring may be a saturated ring, an unsaturated ring or an aromatic ring, for example, 2-pyridyl, 4-pyridyl, 2-imidazolyl, 2-benzimidazolyl, 2-thiazolyl, 2-oxazolyl and the like), an alkoxy group (preferably an alkoxy group having 1 to 20 carbon atoms, for example, methoxy, ethoxy, isopropyloxy, benzyloxy and the like), an aryloxy group (preferably an aryloxy group having 6 to 26 carbon atoms, for example, phenoxy, 1-naphthyloxy, 3-methylphenoxy, 4-methoxyphenoxy and the like), an alkylthio group (preferably an alkylthio group having 1 to 20 carbon atoms, for example, methylthio, ethylthio, isopropylthio, benzylthio and the like), an arylthio (preferably an arylthio having 6 to 26 carbon atoms, for example, phenylthio, 1-naphthylthio, 3-methylphenylthio, 4-methoxyphenylthio and the like), an acyl group (including an alkylcarbonyl group, an alkenylcarbonyl group, an arylcarbonyl group and a heterocyclic carbonyl group, preferably an acyl group having 20 carbon atoms or less, for example, acetyl, pyvaloyl, acryloyl, methacryloyl, benzoyl, nicotinoyl and the like), an aryloylakyl group, an alkoxycarbonyl group (preferably an alkoxycarbonyl group having 2 to 20 carbon atoms, for example, ethoxycarbonyl, 2-ethylhexyloxycarbonyl and the like), an aryloxycarbonyl group (preferably an aryloxycarbonyl group having 7 to 20 carbon atoms, for example, phenyloxycarbonyl, naphthyloxycarbonyl and the like), an amino group (including an amino group, an alkylamino group, an arylamino group and a heterocyclic amino group, preferably an amino group having 0 to 20 carbon atoms, for example, amino, N,N-dimethylamino, N,N-diethylamino, N-ethylamino, anilino, 1-pyrrolidinyl, piperidino, morphonyl and the like), a sulfonamide group (preferably a sulfonamide group having 0 to 20 carbon atoms, for example, N,N-dimethyl sulfonamide, N-phenyl sulfonamide and the like), a sulfamoyl group (preferably a sulfamoyl group having 0 to 20 carbon atoms, for example, N,N-dimethylsulfamoyl, N-phenylsulfamoyl and the like), an acyloxy group (preferably an acyloxy group having 1 to 20 carbon atoms, for example, acetyloxy, benzoyloxy and the like), a carbamoyl group (preferably a carbamoyl group having 1 to 20 carbon atoms, for example, N,N-dimethylcarbamoyl, N-phenylcarbamoyl and the like), an acylamino group (preferably an acylamino group having 1 to 20 carbon atoms, for example, acetylamino, acryloylamino, benzoylamino, nicotinamide and the like), a cyano group, a hydroxyl group, a mercapto group or a halogen atom (for example, a fluorine atom, a chlorine atom, a bromine atom, an iodine atom and the like).

The substituents which may be possessed by $R^{11}$, $R^{13}$ and $R^{15}$ may also have the above-described substituents.

Here, among the substituents which may be possessed by $R^{11}$, $R^{13}$ and $R^{15}$, an alkyl group, an aryl group and an acyl group are preferred.

Among the compounds represented by Formula (2), preferred compounds are listed as follows.

A compound in which any one of $R^{11}$, $R^{13}$ and $R^{15}$ is an aralkyl group.

Meanwhile, the aralkyl group denotes a compound in which an alkyl group is substituted with an aryl group. Among aralkyl groups, preferred is an aralkyl group in which an alkyl group is substituted with one or two aryl groups (in a case of being substituted with two aryl groups, it is preferred that they are substituted on the same carbon atom). Further, also preferred is an aralkyl group in which an alkyl group is substituted with an aryl group and an acyl group (preferably an aryloyl group).

A compound in which any one of $R^{11}$, $R^{13}$ and $R^{15}$ contains a cycloalkyl group, and preferably the group containing a cycloalkyl group is a cycloalkyl group.

The compound represented by Formula (2) is more preferably a compound in which $R^{11}$, $R^{13}$ and $R^{15}$ are an alkyl group having 1 to 20 carbon atoms, an alkenyl group having 2 to 20 carbon atoms or an aryl group having 6 to 20 carbon atoms, from the viewpoint of the dissolution stability during the film formation. Further, it is more preferred that each of $R^{11}$, $R^{13}$ and $R^{15}$ has one or more ring structures, and it is even more preferred that each has one ring structure.

The compound represented by Formula (2) is more preferably represented by the following Formula (2-a).

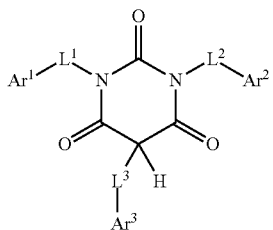

(2-a)

In Formula (2-a), each of $L^1$ to $L^3$ independently represents a single bond or a divalent linking group having 1 or more carbon atoms. $L^1$ to $L^3$ are more preferably a single bond or an alkylene group having 1 to 6 carbon atoms, even more preferably a single bond, a methylene group or an ethylene group, and particularly preferably a single bond or a methylene group. Considering the dissolution stability, at least one of $L^1$ to $L^3$ is preferably an alkylene group having 1 to 6 carbon atoms. The divalent linking group may have a substituent, and the substituent has the same meaning as the substituent which may be possessed by $R^{11}$, $R^{13}$ and $R^{15}$ as described above.

In Formula (2-a), $Ar^1$ to $Ar^3$ represent an aryl group having 6 to 20, preferably a phenyl group and a naphthyl group, and more preferably a phenyl group. $Ar^1$ to $Ar^3$ may have a substituent, and the substituent have the same meaning as the substituent which may be possessed by $R^{11}$, $R^{13}$ and $R^{15}$ as described above. $Ar^1$ to $Ar^3$ may not have a substituent, or in a case of having a substituent, the substituent preferably does not have a ring structure.

The molecular weight of the compound represented by Formula (2) or Formula (2-a) is preferably 250 to 1,200, more preferably 300 to 800, and particularly preferably 350 to 600.

If the molecular weight is too low, the volatilization from the film may be problematic. If the molecular weight is too high, the haze may be increased.

Hereinafter, specific examples of the compound represented by Formula (2) or Formula (2-a) will be described, but the present invention is not limited thereto. In the following exemplary compounds, Me represents a methyl group.

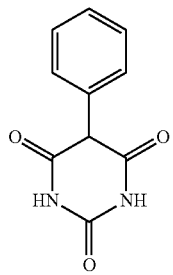

(2-1)

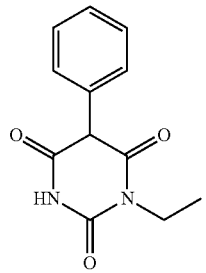

(2-2)

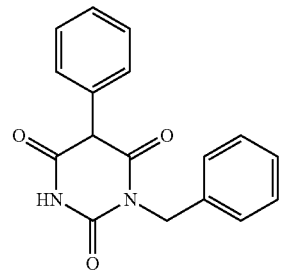

(2-3)

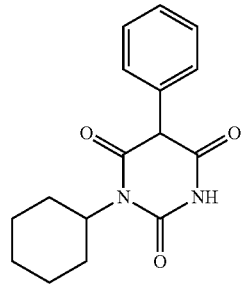

(2-4)

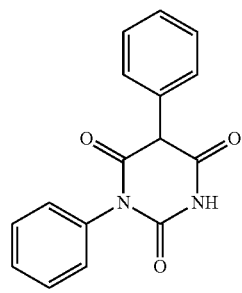

(2-5)

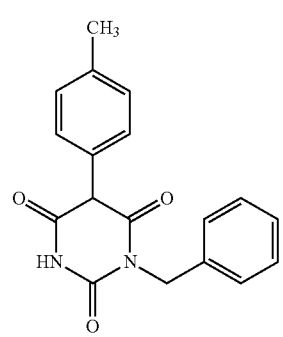

(2-6)

(2-7)
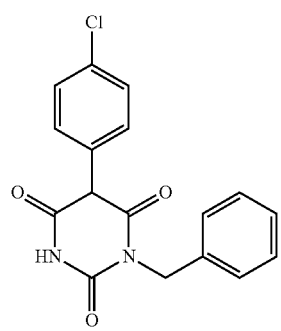
A-1
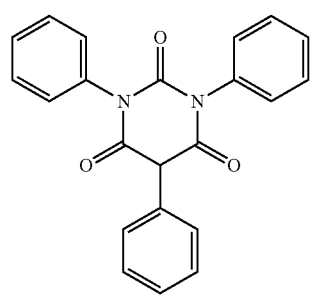
A-2
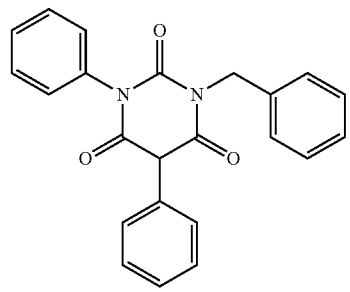
A-3
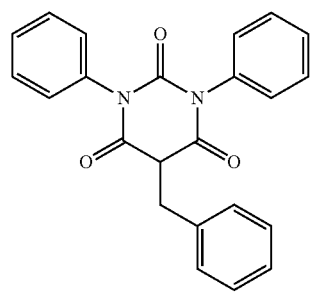
A-4
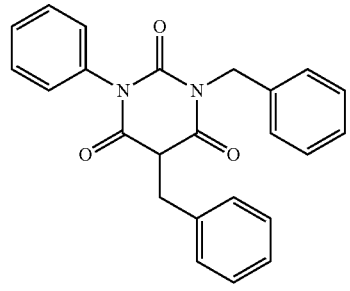
A-5
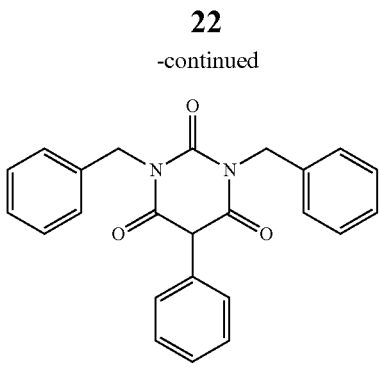
A-6
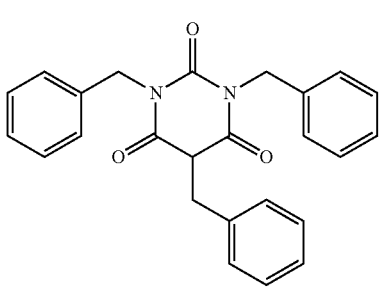
A-7
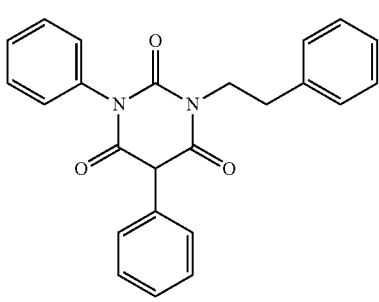
A-8
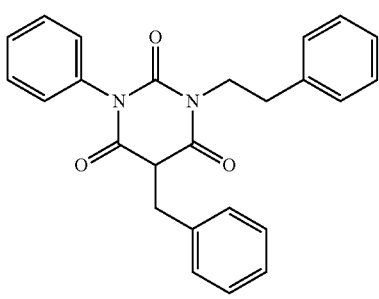
A-9
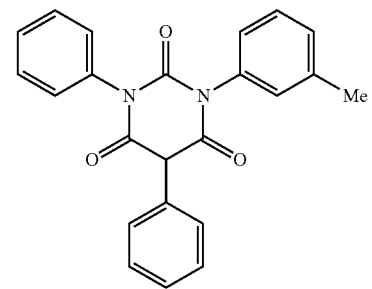

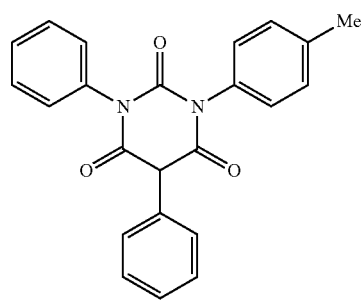
A-10
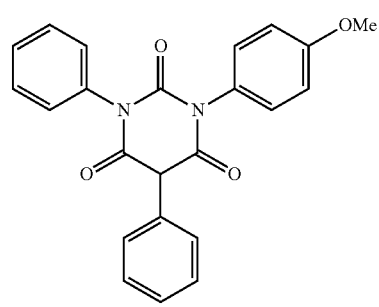
A-11
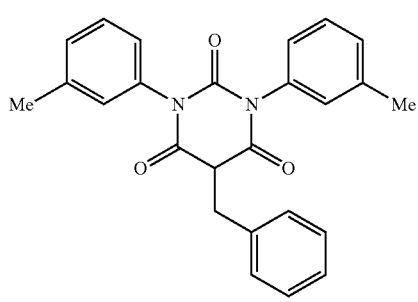
A-12
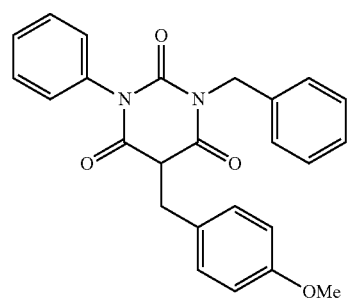
A-13
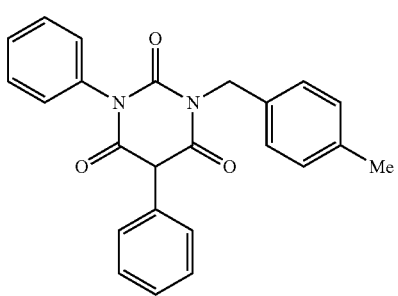
A-14
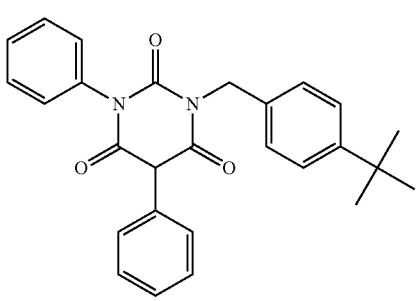
A-15
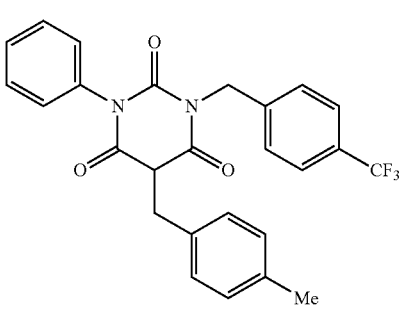
A-16
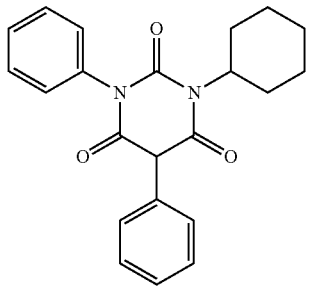
A-17
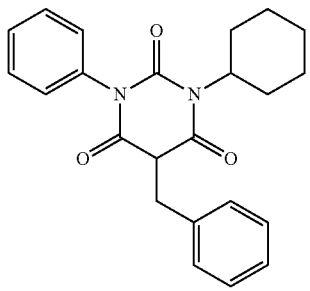
A-18
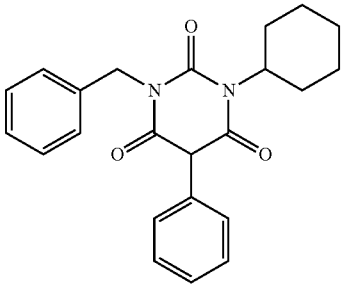
A-19

A-20
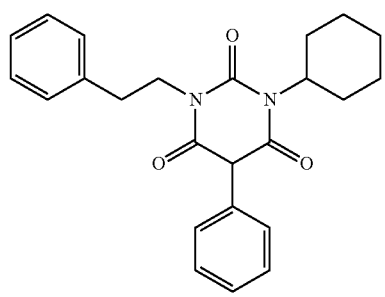
A-21
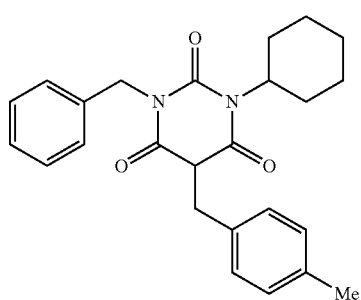
A-22
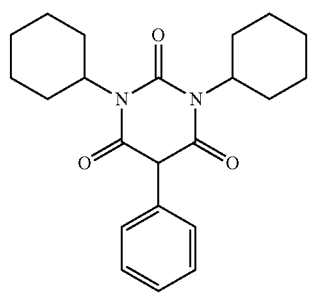
A-23
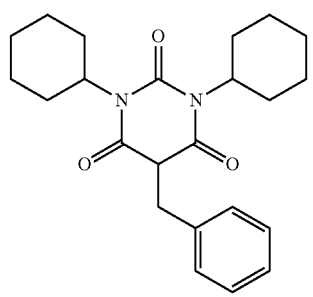
A-24
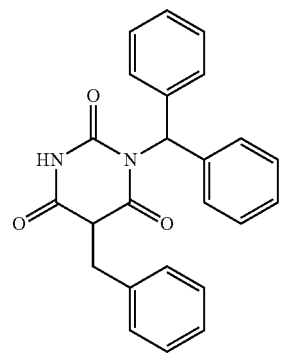
A-25
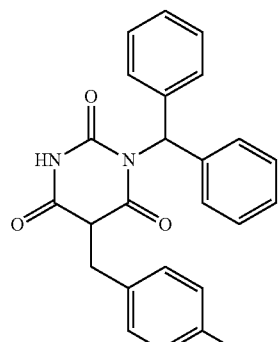
A-26
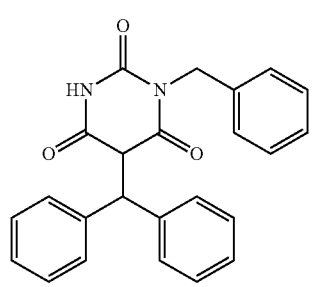
A-27
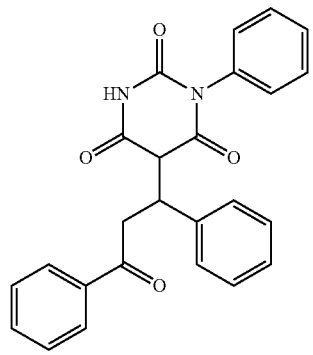
A-28
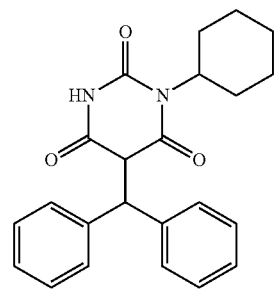
A-29
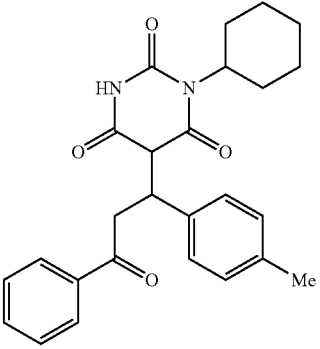

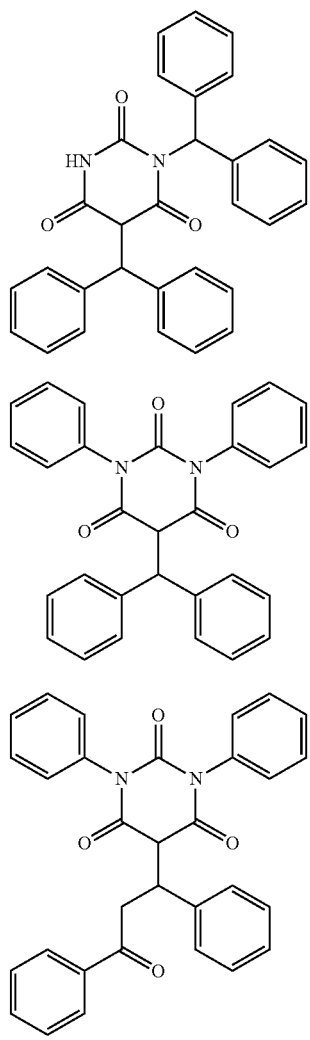

It is known that the compound represented by Formula (2) can be synthesized using a synthesis of barbituric acid in which a urea derivative and a malonic acid derivative are condensed. Barbituric acid which has two substituents on N is obtained by heating N,N'-disubstituted urea and malonic chloride, or heating malonic acid in combination with an activator such as acetic anhydride. For example, methods as described in Journal of the American Chemical Society, Vol. 61, p 1015 (1939); Journal of Medicinal Chemistry, Vol. 54, p 2409 (2011); Tetrahedron Letters, Vol. 40, p 8029 (1999); WO2007/150011 and the like may be preferably used.

Further, the malonic acid used in the condensation may be unsubstituted or substituted. When using malonic acid having a substituent corresponding to $R^5$, barbituric acid is constituted, and thus, the compound of the present invention represented by Formula (2) can be synthesized. Further, when unsubstituted malonic acid and a urea derivative are condensed, barbituric acid, which is unsubstituted at the 5-position, can be obtained. Therefore, the compound of the present invention represented by Formula (2) may be synthesized by modifying the barbituric acid.

Meanwhile, synthesis of the compound represented by Formula (2) which is used in the present invention is not limited the above-described synthesis.

(Content of Polarizer Durability Enhancer)

The polarizer durability enhancer is present in an amount of preferably 1% by mass to 20% by mass based on a main component resin constituting the polarizing plate protective film (main component resin refers to a resin having the largest mass ratio among resins contained in the polarizing plate protective film). When the amount is 1% by mass or more, it is easy to obtain the polarizer durability improvement effect, and when the amount is 20% by mass or less, it is difficult to bleed-out or leach during the film formation of the polarizing plate protective film. The content of the organic acid is more preferably 1% by mass to 15% by mass, and particularly preferably 1% by mass to 10% by mass.

(2-4) Hydrophobizing Agent

The polarizing plate protective film of the present invention preferably contains a carbohydrate derivative as a hydrophobizing agent.

(Carbohydrate Derivative-based Plasticizer)

The hydrophobizing agent is preferably a monosaccharide or a derivative of carbohydrate containing 2 to 10 monosaccharide units (hereinafter, referred to as carbohydrate derivative-based plasticizer).

The monosaccharide or polysaccharide preferably constituting the carbohydrate derivative-based plasticizer is characterized in that a substitutable group (for example, a hydroxyl group, a carboxyl group, an amino group, a mercapto group and the like) in a molecule is substituted. Examples of the structure formed by substitution include an alkyl group, an aryl group, an acyl group and the like. Further, examples thereof include an ether structure formed by substitution thereof, an ester structure formed by substituting a hydroxyl group with an acyl group, an amide structure or an imide structure formed by substitution with an amino group and the like.

Examples of the carbohydrate including monosaccharide or 2 to 10 monosaccharide units include erythrose, threose, ribose, arabinose, xylose, lyxose, allose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol, sorbitol and the like.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol and sorbitol, more preferred are arabinose, xylose, glucose, fructose, mannose, galactose, maltose, cellobiose, sucrose, β-cyclodextrin, γ-cyclodextrin, and particularly preferred are xylose, glucose, fructose, mannose, galactose, maltose, cellobiose, sucrose, xylitol and sorbitol.

In addition, examples of the substituent of the carbohydrate derivative-based plasticizer include an alkyl group (an alkyl group having preferably 1 to 22 carbon atoms, more preferably 1 to 12 carbon atoms, and particularly preferably 1 to 8 carbon atoms, and for example, a methyl group, an ethyl group, a propyl group, a hydroxyethyl group, a hydroxypropyl group, a 2-cyanoethyl group, a benzyl group and the like), an aryl group (an aryl group having preferably 6 to 24 carbon atoms, more preferably 6 to 18 carbon atoms, and particularly preferably 6 to 12, and for example, a phenyl group and a naphthyl group), an, acyl group (an acyl group having preferably 1 to 22 carbon atoms, more preferably 2 to 12 carbon atoms, and particularly preferably 2 to 8 carbon atoms, and for example, an acetyl group, a propionyl group, a butyryl group, a pentanoyl group, a hexanoyl group, an octanoyl group, a benzoyl group, a toluoyl group, a phthalyl group, a naphthol group and the like) and the like. Furthermore, examples of the preferred structure formed by substitution with an amino group include an amide structure (preferably an amide having preferably 1 to 22 carbon atoms, more preferably 2 to 12 carbon atoms and particularly preferably 2 to 8 carbon atoms, and for example, formamide, acetamide and the like) and an imide structure (an imide having preferably 4 to 22 carbon atoms, more preferably 4 to 12 carbon atoms and particularly preferably 4 to 8 carbon atoms, and for example, succinimide, phthalimide and the like).

Among them, more preferred are an alkyl group, an aryl group or an acyl group; and particularly preferred is an acyl group.

Preferred examples of the carbohydrate derivative-based plasticizer include the followings. However, the carbohydrate derivative-based plasticizer which may be used in the present invention is not limited thereto.

Preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate and the like. More preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate and sorbitol hexabenzoate. Particularly preferred are maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate and the like.

The carbohydrate derivative-based hydrophobizing agent preferably has a pyranose structure or a furanose structure.

As the carbohydrate derivative used in the present invention, compounds represented as follows are particularly preferred. However, the carbohydrate derivative which may be used in the present invention is not limited thereto. Meanwhile, in the following structural formula, each R independently represents any substituent, and may be the same as or different from every other R.

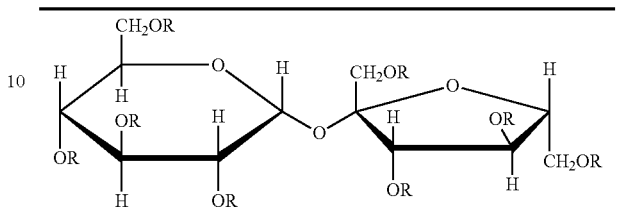

| Compound | Substituent 1 Kind | Degree of substitution | Substituent 2 Kind | Degree of substitution | Molecular weight |
|---|---|---|---|---|---|
| K-101 | Acetyl | 7 | Benzyl | 1 | 727 |
| K-102 | Acetyl | 6 | Benzyl | 2 | 775 |
| K-103 | Acetyl | 7 | Benzoyl | 1 | 741 |
| K-104 | Acetyl | 6 | Benzoyl | 2 | 802 |
| K-105 | Benzyl | 2 | None | 0 | 523 |
| K-106 | Benzyl | 3 | None | 0 | 613 |
| K-107 | Benzyl | 4 | None | 0 | 702 |
| K-108 | Acetyl | 7 | Phenylacetyl | 1 | 771 |
| K-109 | Acetyl | 6 | Phenylacetyl | 2 | 847 |
| K-110 | Benzoyl | 1 | None | 0 | 446 |
| K-111 | Benzoyl | 2 | None | 0 | 551 |
| K-112 | Benzoyl | 3 | None | 0 | 655 |
| K-113 | Benzoyl | 4 | None | 0 | 759 |
| K-114 | Benzoyl | 5 | None | 0 | 863 |
| K-115 | Benzoyl | 6 | None | 0 | 967 |
| K-116 | Benzoyl | 7 | None | 0 | 1071 |
| K-117 | Benzoyl | 8 | None | 0 | 1175 |

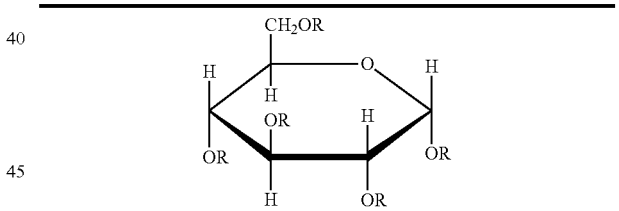

| Compound | Substituent 1 Kind | Degree of substitution | Substituent 2 Kind | Degree of substitution | Molecular weight |
|---|---|---|---|---|---|
| K-201 | Acetyl | 4 | Benzoyl | 1 | 468 |
| K-202 | Acetyl | 3 | Benzoyl | 2 | 514 |
| K-203 | Acetyl | 2 | Benzoyl | 3 | 577 |
| K-204 | Acetyl | 4 | Benzyl | 1 | 454 |
| K-205 | Acetyl | 3 | Benzyl | 2 | 489 |
| K-206 | Acetyl | 2 | Benzyl | 3 | 535 |
| K-207 | Acetyl | 4 | Phenylacetyl | 1 | 466 |
| K-208 | Acetyl | 3 | Phenylacetyl | 2 | 543 |
| K-209 | Acetyl | 2 | Phenylacetyl | 3 | 619 |
| K-210 | Phenylacetyl | 1 | None | 0 | 298 |
| K-211 | Phenylacetyl | 2 | None | 0 | 416 |
| K-212 | Phenylacetyl | 3 | None | 0 | 535 |
| K-213 | Phenylacetyl | 4 | None | 0 | 654 |
| K-214 | Acetyl | 1 | Benzoyl | 4 | 639 |
| K-215 | Acetyl | 0 | Benzoyl | 5 | 701 |

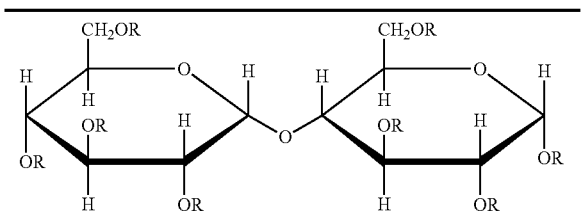

| Com- pound | Substituent 1 | | Substituent 2 | | Molecular weight |
|---|---|---|---|---|---|
| | Kind | Degree of substitution | Kind | Degree of substitution | |
| K-301 | Acetyl | 6 | Benzoyl | 2 | 803 |
| K-302 | Acetyl | 6 | Benzyl | 2 | 775 |
| K-303 | Acetyl | 6 | Phenyl-acetyl | 2 | 831 |
| K-304 | Benzoyl | 2 | None | 0 | 551 |
| K-305 | Benzyl | 2 | None | 0 | 522 |
| K-306 | Phenyl-acetyl | 2 | None | 0 | 579 |

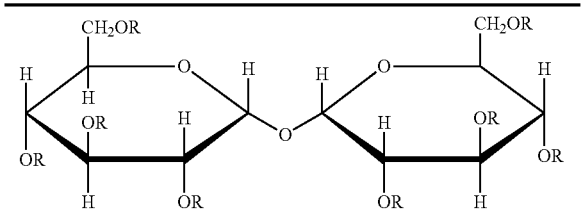

| Com- pound | Substituent 1 | | Substituent 2 | | Molecular weight |
|---|---|---|---|---|---|
| | Kind | Degree of substitution | Kind | Degree of substitution | |
| K-401 | Acetyl | 6 | Benzoyl | 2 | 803 |
| K-402 | Acetyl | 6 | Benzyl | 2 | 775 |
| K-403 | Acetyl | 6 | Phenyl-acetyl | 2 | 831 |
| K-404 | Benzoyl | 2 | None | 0 | 551 |
| K-405 | Benzyl | 2 | None | 0 | 523 |
| K-406 | Phenyl-ester | 2 | None | 0 | 579 |

(Obtaining Method)

As an obtaining method of the carbohydrate derivative, a product manufactured by Tokyo Chemical Industry Co., Ltd., by Aldrich or the like may be commercially available, or the carbohydrate derivative may be synthesized by performing a known method for processing a commercially available carbohydrate into an ester derivative (for example, the method described in Japanese Patent Application Laid-Open No. H8-245678).

As an obtaining method of the carbohydrate derivative-based plasticizer, a product manufactured by Tokyo Chemical Industry Co., Ltd., by Aldrich or the like may be commercially available, or the carbohydrate derivative-based plasticizer may be synthesized by performing a known method for processing a commercially available carbohydrate into an ester derivative (for example, the method described in Japanese Patent Application Laid-Open No. H8-245678).

A compound represented by the following Formula (4) (hereinafter, referred to as "aromatic terminal ester-based compound") may also be preferably used as a hydrophobizing agent of the polarizing plate protective film of the present invention.

$$B-(G-A)n-G-B \qquad \text{Formula (4)}$$

(In the formula, each B independently represents a benzene monocarboxylic acid residue. Each G independently represents an alkylene glycol residue having 2 to 12 carbon atoms, an aryl glycol residue having 6 to 12 carbon atoms or an oxyalkylene glycol residue having 4 to 12 carbon atoms. A represents an alkylene dicarboxylic acid residue having 4 to 12 carbon atoms or an aryl dicarboxylic acid residue having 6 to 12 carbon atoms. n represents an integer of 0 or higher.)

The aromatic terminal ester-based compound represented by Formula (4) is formed with the benzene mono carboxyl residue represented by B, the alkylene glycol residue, the oxyalkylene glycol residue, or the aryl glycol residue represented by G, and the alkylene dicarboxylic acid residue or the aryl dicarboxylic acid residue represented by A in Formula (4), and is obtained by a typical reaction such as polyester (polycondensation ester).

Meanwhile, the "residue" in the present specification refers to a partial structure of the aromatic terminal ester-based compound represented by Formula (4), and represents the partial structure having characteristics of a monomer forming the compound (polymer). For example, the monocarboxylic acid residue formed from the monocarboxylic acid R—COOH is R—CO—.

Examples of the benzene monocarboxylic acid in the benzene monocarboxylic acid residue include benzoic acid, para-tertiary butyl-benzoic acid, ortho-toluic acid, meta-toluic acid, para-toluic acid, dimethylbenzoic acid, ethylbenzoic acid, normal propylbenzoic acid, aminobenzoic acid, acetoxybenzoic acid and the like, and these may be used either alone or as a mixture of two or more thereof.

Among them, preferred are benzoic acid, ortho-toluic acid, meta-toluic acid and para-toluic acid, and more preferred are benzoic acid, ortho-toluic acid and meta-toluic acid.

The alkylene glycol in the alkylene glycol residue is an alkylene glycol having 2 to 12 carbon atoms, preferably 2 to 6 carbon atoms and more preferably 2 to 3 carbon atoms.

Examples of the alkylene glycol include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and the like, and the glycols may be used either alone or as a mixture of two or more thereof.

Among them, preferred are 1,4-butanediol, ethylene glycol, 1,2-propylene glycol and 1,3-propylene glycol, and more preferred are ethylene glycol, 1,2-propylene glycol and 1,3-propylene glycol.

The oxyalkylene glycol in the oxyalkylene glycol residue is an oxyalkylene glycol having 4 to 12 carbon atoms, preferably 4 to 8 carbon atoms and more preferably 4 to 6 carbon atoms.

Examples of the oxyalkylene glycol include diethylene glycol, triethylene glycol, tetraethylene glycol, dipropylene glycol, tripropylene glycol and the like, and these glycols may be used either alone or as a mixture of two or more thereof. Among them, diethylene glycol and dipropylene glycol are preferred.

The aryl glycol in the aryl glycol residue is an aryl glycol having 6 to 12 carbon atoms and preferably 6 to 8 carbon atoms.

Examples of the aryl glycol include hydroquinone, resorcin, bisphenol A, bisphenol F, bisphenol and the like, and these glycols may be used either alone or as a mixture of two or more thereof.

Among them, hydroquinone and resorcin are preferred, and hydroquinone is more preferred.

The alkylene dicarboxylic acid in the alkylene dicarboxylic acid residue is an alkylene dicarboxylic acid having 4 to 12 carbon atoms, preferably 4 to 10 carbon atoms and more preferably 4 to 8 carbon atoms.

Examples of the alkylene dicarboxylic acid include succinic acid, maleic acid, fumaric acid, glutaric acid, adipic acid, azelaic acid, sebacic acid, dodecane dicarboxylic acid and the like, and these may be used either alone or as a mixture of two or more thereof.

Among them, succinic acid and maleic acid are preferred, and succinic acid is more preferred.

The aryl dicarboxylic acid in the aryl dicarboxylic acid residue is an alkylene dicarboxylic acid having 8 to 12 carbon atoms.

Examples of the aryl dicarboxylic acid include phthalic acid, terephthalic acid, 1,5-naphthalene dicarboxylic acid, 1,4-naphthalene dicarboxylic acid and the like. These may be used either alone or as a mixture of two or more thereof.

Among them, 1,5-naphthalene dicarboxylic acid, phthalic acid and terephthalic acid are preferred, and phthalic acid and terephthalic acid are more preferred.

In Formula (4), n is preferably 0 to 4, more preferably 1 to 3, and even more preferably 1 to 2.

The aromatic terminal ester-based compound of the present invention has a number average molecular weight in a range of preferably 300 to 2,000, and more preferably 500 to 1,500. Further, the acid value thereof is 0.5 mgKOH/g or less, and the hydroxyl group value thereof is 25 mgKOH/g or less. More preferably, the acid value is 0.3 mgKOH/g or less, and the hydroxyl group value is appropriately 15 mgKOH/g or less.

(Acid Value and Hydroxyl Group Value of Aromatic Terminal Ester-Based Compound)

Here, the acid value refers to the number of milligrams of potassium hydroxide that is necessary to neutralize an acid (carboxyl groups present at the terminal of a molecule) contained in 1 g of a sample.

The hydroxyl group value refers to the milligram number of potassium hydroxide required to neutralize acetic acid which is bonded to an OH group contained in 1 g of a sample.

The acid value and the hydroxyl group value are measured in accordance with JIS K0070.

Hereinafter, synthetic examples of the aromatic terminal ester-based plasticizer according to the present invention will be shown.

<Sample No. 1 (Aromatic Terminal Ester Sample)>

820 parts by weight (5 mole) of phthalic acid, 608 parts by weight (8 mole) of 1,2-propylene glycol, 610 parts by weight (5 mole) of benzoic acid and 0.30 part by weight of tetraisopropyl titanate as a catalyst are collectively provided in a reaction container, and while a reflux condenser is attached to the container and an excess of a monohydric alcohol is refluxed with stirring under nitrogen flow, heating continues to be performed at 130° C. to 250° C. until the acid value becomes 2 or less to continuously remove water produced. Subsequently, the distillate is removed at 200° C. to 230° C. under reduced pressure of $6.65 \times 10^3$ Pa to finally $4 \times 10^2$ Pa, and then filtration is performed to obtain an aromatic terminal ester having the following properties.

Viscosity (25° C., mPa·s): 19815

Acid value: 0.4

<Sample No. 2 (Aromatic Terminal Ester Sample)>

An aromatic terminal ester having the following properties is obtained in the exactly same manner as in the sample No. 1, except that 500 parts by weight (3.5 mole) of adipic acid, 305 parts by weight (2.5 mole) of benzoic acid, 583 parts by weight (5.5 mole) of diethylene glycol and 0.45 part by weight of tetraisopropyl titanate as a catalyst are used in a reaction container.

Viscosity (25° C., mPa·s): 90

Acid value: 0.05

<Sample No. 3 (Aromatic Terminal Ester Sample)>

An aromatic terminal ester-based plasticizer having the following properties is obtained in the exactly same manner as in the sample No. 1, except that 410 parts by weight (2.5 mole) of phthalic acid, 610 parts by weight (5 mole) of benzoic acid, 737 parts by weight (5.5 mole) of dipropylene glycol and 0.40 part by weight of tetraisopropyl titanate as a catalyst are used in a reaction container.

Viscosity (25° C., mPa·s): 43400

Acid value: 0.2

Hereinafter, specific compounds of the aromatic terminal ester-based plasticizer according to the present invention will be shown, but the present invention is not limited thereto.

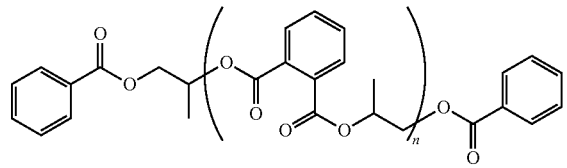

| Additive | n | Molecular weight |
|---|---|---|
| A-0 | 0 | 284 |
| A-1 | 1 | 491 |
| A-2 | 2 | 697 |
| A-3 | 3 | 903 |

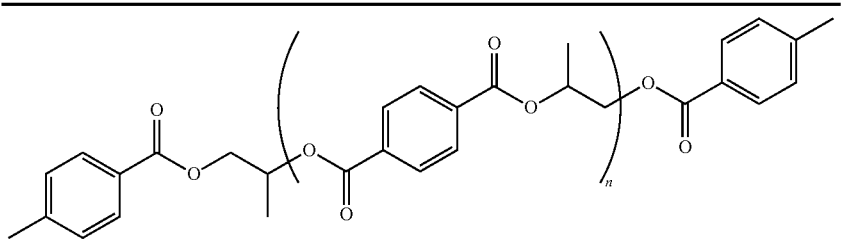

| Additive | n | Molecular weight |
|---|---|---|
| B-0 | 0 | 312 |
| B-1 | 1 | 519 |
| B-2 | 2 | 725 |
| B-3 | 3 | 931 |

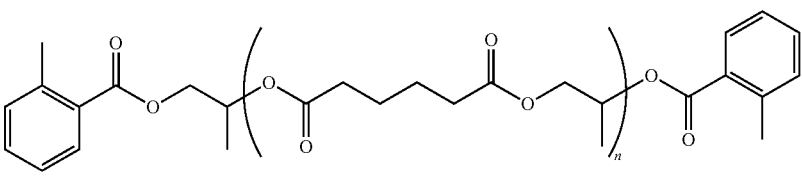

| Additive | n | Molecular weight |
|---|---|---|
| C-0 | 0 | 312 |
| C-1 | 1 | 471 |
| C-2 | 2 | 657 |
| C-3 | 3 | 843 |

The content of the compound represented by Formula (4) used in the present invention is preferably 2% by mass to 20% by mass, and more preferably 5% by mass to 15% by mass based on cellulose ester in the cellulose acylate film.

The cellulose acylate film of the present invention may contain two or more of the compounds represented by Formula (4) from the viewpoint of reducing the haze of the film. When two or more thereof are used, the total amount of the contents is preferably within the above-described range. When two or more thereof are used, it is particularly preferred to mix compounds which are different in n in the above-described structure from the viewpoint of reducing the haze of the film.

The hydrophobizing agent of the present invention is present in an amount of preferably 1% by mass to 30% by mass based on a main component resin constituting the polarizing plate protective film (main component resin refers to a resin having the largest mass ratio among resins contained in the polarizing plate protective film). When the amount is 1% by mass or more, it is easy to obtain the polarizer durability improvement effect, and when the amount is 30% by mass or less, it is difficult to generate bleed-out or leach during the film formation of the polarizing plate protective film. The content of the hydrophobizing agent is more preferably 5% by mass to 20% by mass, and particularly preferably 5% by mass to 15% by mass.

[Method for Preparing Polarizing Plate]

Hereinafter, the method for preparing the polarizing plate of the present invention will be described in the sequence of a method for preparing a polarizing plate protective film, a method for preparing a polarizer, a method for stacking a polarizing plate protective film and a polarizer and a functionalization of the polarizing plate.

<Method for Preparing Polarizing Plate Protective Film>

The polarizing plate protective film may be prepared by a solvent cast method.

Hereinafter, the method for preparing the polarizing plate protective film will be described by exemplifying an aspect in which cellulose acylate is used as a main component resin, but the polarizing plate protective film containing the organic acid may be prepared likewise even when other resins are used.

In the solvent cast method, a solution (dope) in which cellulose acylate is dissolved in an organic solvent is used to prepare a film.

The organic solvent preferably contains a solvent selected from an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. In addition, a compound having two or more of any one of the functional groups of ether, ketone and ester (that is, —O—, —CO— and —COO—) may also be used as the organic solvent. The organic solvent may have other functional groups such as an alcoholic hydroxyl group. In the case of an organic solvent having two or more functional groups, it is preferred that the number of carbon atoms thereof is within the preferred range of the number of carbon atoms, which is described above, of the solvent having any one functional group.

Examples of the ethers having 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having 3 to 12 carbon atoms include acetone, methyl ethyl ketone, diethyl ketone, diisobutyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Furthermore, examples of the organic solvent having two or more of functional groups include 2-ethoxyethyl acetate, 2-methoxyethanol and 2-butoxyethanol.

The number of carbon atoms in the halogenated hydrocarbon having 1 to 6 carbon atoms is preferably 1 or 2, and most preferably 1. The halogen in the halogenated hydrocarbon is preferably chlorine. The ratio of hydrogen atoms in the halogenated hydrocarbon to be substituted with halogens is preferably 25% by mole to 75% by mole, more preferably 30% by mole to 70% by mole, even more preferably 35% by mole to 65% by mole, and most preferably 40% by mole to 60% by mole. Methylene chloride is a representative halogenated hydrocarbon.

Further, the organic solvent may be used in a mixture of two or more thereof.

A cellulose acylate solution (dope) may be prepared by a general method of performing a treatment at a temperature of 0° C. or higher (normal temperature or high temperature). The cellulose acylate solution can be prepared using a method and an apparatus for preparing a dope in a typical solvent cast method. Further, in the case of the general method, a halogenated hydrocarbon (particularly, methylene chloride) is preferably used as the organic solvent.

The amount of cellulose acylate in the cellulose acylate solution is adjusted to occupy 10% by mass to 40% by mass in the solution obtained. The amount of cellulose acylate is more preferably 10% by mass to 30% by mass. Any additives to be described below may be added in the organic solvent (main solvent).

The cellulose acylate solution may be prepared by stirring the cellulose acylate and the organic solvent at normal temperature (0° C. to 40° C.). A solution at a high concentration may be stirred under pressurization and heating conditions. Specifically, cellulose acylate and an organic solvent are put in a pressure vessel and after sealing the vessel, the mixture is stirred under pressure while being heated at a temperature in a range from a temperature not less than the boiling point of the solvent at normal temperature to a temperature not allowing for boiling of the solvent. The heating temperature is usually 40° C. or higher, preferably 60° C. to 200° C., and more preferably 80° C. to 110° C.

Each component may be roughly mixed in advance and then put in the vessel. In addition, the components may be successively introduced into the vessel. The vessel needs to be configured such that the vessel may be stirred. The vessel may be pressurized by injecting an inert gas such as a nitrogen gas and the like. Furthermore, a rise in vapor pressure of the solvent due to heating may be utilized. Alternatively, after sealing the vessel, each component may be added under pressure.

In the case of heating the vessel, the heating is preferably performed from the outside of the vessel. For example, a jacket-type heating device may be used. Further, the entire vessel may be heated by providing a plate heater on the outside of the vessel and laying a pipe to circulate a liquid thereinto.

The vessel is preferably stirred by providing a stirring blade inside the vessel and using the stirring blade. The stirring blade having a length long enough to reach near the wall of the vessel is preferred. A scraping blade is preferably provided at the terminal of the stirring blade for the purpose of renewing a liquid film of the wall of the vessel.

The vessel may be equipped with measuring meters such as pressure gauge, thermometer and the like. In the vessel, each component is dissolved in a solvent. The prepared dope is cooled and then taken out of the vessel, or taken out of the vessel and then cooled by using a heat exchanger or the like.

The cellulose acylate solution may also be prepared by the cooling dissolution method. For details on the cooling dissolution method, it is possible to use a technology described in to [0122] of Japanese Patent Application Laid-Open No. 2007-86748.

A cellulose acylate film may be prepared from the prepared cellulose acylate solution (dope) by a solvent cast method. A retardation developer is preferably added to the dope. The dope is cast on a drum or a band, and the solvent is evaporated to form a film. It is preferred that the dope before casting is adjusted so as to have a concentration in a range of 18% by mass to 35% by mass in terms of solid content. It is preferred that the surface of the drum or band is mirror-finished. It is preferred that the dope is cast on a drum or a band having a surface temperature of 10° C. or lower.

Drying methods in the solvent cast method are described in each of U.S. Pat. Nos. 2,336,310, 2,367,603, 2,492,078, 2,492,977, 2,492,978, 2,607,704, 2,739,069, and 2,739,070, British Patent Nos. 640731 and 736892, and Japanese Patent Application Publication Nos. S45-4554 and S49-5614 and Japanese Patent Application Laid-Open Nos. 560-176834, 560-203430, and S62-115035. The dope on the band or drum may be dried by blowing an inert gas such as air and nitrogen.

In addition, the obtained film is peeled off from the drum or band and further dried by high-temperature air whose temperature is sequentially varied from 100° C. to 160° C., whereby the residual solvent may also be evaporated. The above-described method is described in Japanese Patent Application Publication No. H5-17844. According to the method, it is possible to shorten the time from casting to peeling-off. In order to carry out the method, the dope needs to be gelled at the surface temperature of the drum or band during casting.

The prepared cellulose acylate solution (dope) may also be turned into a film by casting the solution in two or more layers. In this case, it is preferred that the cellulose acylate film is prepared by a solvent cast method. The dope is cast on a drum or a band, and the solvent is evaporated to form a film. It is preferred that the dope before casting is adjusted so as to have a concentration in a range of 10% by mass to 40% by mass in terms of solid content. It is preferred that the surface of the drum or band is mirror-finished.

In the case of casting a plurality of cellulose acylate solutions in two or more layers, it is possible to cast a plurality of cellulose acylate solutions, and a film may be prepared by casing and stacking respective cellulose acylate-containing solutions from a plurality of casting nozzles formed at intervals in the support traveling direction. For the methods, it is possible to use the methods as described in, for example, Japanese Patent Application Laid-Open No. S61-158414 and Japanese Patent Application Laid-Open Nos. H1-122419 and H11-198285. Furthermore, a film may also be formed by casting a cellulose acylate solution from two casting nozzles. For this, it is possible to use the methods as described in, for example, Japanese Patent Application Publication No. S60-27562 and Japanese Patent Application Laid-Open Nos. S61-94724, S61-947245, S61-104813, S61-158413 and H6-134933. Further, it is also possible to use a method for casting a cellulose acylate film, including: surrounding the flow of a high-viscosity cellulose acylate solution with a low-viscosity cellulose acylate solution; and simultaneously extruding the high and low viscosity cellulose acylate solutions, which is described in Japanese Patent Application Laid-Open No. S56-162617.

In addition, a film may also be prepared using two casting nozzles by peeling off a film formed on a support by means of a first casting nozzle and then performing a second casting on the side that is in contact with the support surface. Examples of the method include the method described in Japanese Patent Application Publication No. S44-20235.

As the cellulose acylate solutions to be cast, the same solution may be used and two or more of different cellulose acylate solutions may be used. In order to allow a plurality of cellulose acylate layers to have functions, cellulose acylate solutions corresponding to the respective functions may be extruded from each casting nozzle. Furthermore, the cellulose acylate solution in the present invention may be cast simultaneously with another functional layer (for example, an adhesion layer, a dye layer, an antistatic layer, an anti-halation layer, an ultraviolet ray absorbing layer, a polarizing layer and the like).

(Addition of Polarizer Durability Enhancer)

For the cellulose acylate solution that is a resin raw material of a polarizing plate protective film, the timing of adding the polarizer durability enhancer is not particularly limited as long as the polarizer durability enhancer is added thereto at the time when the film is formed. For example, the polarizer durability enhancer may be added at the time of synthesizing cellulose acylate, and may be mixed with cellulose acylate at the time of preparing the dope.

(Addition of Ultraviolet Absorber)

In the present invention, an ultraviolet absorber may be added to the cellulose acylate solution from the viewpoint of preventing a polarizing plate, a liquid crystal cell or the like from deteriorating. UV absorbers are preferably used, which have excellent ability to absorb UV ray at a wavelength of 370 nm or less and low absorption of visible light at a wavelength of 400 nm or more from the viewpoint of good liquid crystal display performance. Specific examples of UV absorbers that are preferably used in the present invention include hindered phenol-based compounds, hydroxybenzophenone-based compounds, benzotriazole-based compounds, salicylic acid ester-based compounds, benzophenone-based compounds, cyano acrylate-based compounds, nickel complex salt-based compounds and the like. Examples of the hindered phenol-based compounds include 2,6-di-tert-butyl-p-cresol, pentaerythrityl-tetrakis[3-(3,5-di-tert-butyl-4-hydroxyphenyl) propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, tris-(3,5-di-tert-butyl-4-hydroxybenzyl)-isocyanurate and the like. Examples of the benzotriazole-based compounds include 2-(2'-hydroxy-5'-methylphenyl)benzotriazole, 2,2-methylenebis(4-(1,1,3,3-tetramethylbutyl)-6-(2H-benzotriazole-2-yl)phenol), (2,4-bis-(n-octylthio)-6-(4-hydroxy-3,5-di-tert-butylanilino)-1,3, 5-triazine, triethylene glycol-bis[3-(3-tert-butyl-5-methyl-4-hydroxyphenyl)propionate], N,N-hexamethylenebis(3,5-di-tert-butyl-4-hydroxy-hydrocinnamide), 1,3,5-trimethyl-2,4, 6-tris(3,5-di-tert-butyl-4-hydroxybenzyl)benzene, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-crezole, pentaerythrityl-tetrakis[3-(3, 5-di-tert-butyl-4-hydroxyphenyl)propionate] and the like. The amount of the ultraviolet absorber added is preferably 0.1 parts by mass to 10.0 parts by mass based on 100 parts by mass of the optical film.

(Addition of other Additives)

In the polarizing plate protective film, a deterioration inhibitor (for example, antioxidant, peroxide decomposer, radical inhibitor, metal deactivator, acid scavenger, amine and the like) may be added. The deterioration inhibitor is described in Japanese Patent Application Laid-Open Nos. H3-199201, H5-1907073, H5-194789, H5-271471 and H6-107854. Further, the amount of the deterioration inhibitor added is preferably 0.01% by mass to 1% by mass, and more preferably 0.01% by mass to 0.2% by mass based on the solution (dope) prepared. When the amount added is 0.01% by mass or more, the effect of the deterioration inhibitor may be sufficiently brought out, and thus, the amount is preferred, and when the amount added is 1% by mass or less, it is difficult for the deterioration inhibitor to bleed-out (leaching) to the film surface and the like to occur, and thus, the range is preferred. In particular, preferred examples of the deterioration inhibitor include butylated hydroxytoluene (BHT) and tribenzylamine (TBA).

In addition, in the polarizing plate protective film, particles are preferably added as a mat agent. Examples of the particles used in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Among the particles, a particle containing silicon is preferred in that the turbidity is reduced, and silicon dioxide is particularly preferred. The silicon dioxide particle is preferably a particle having an average primary particle diameter of 20 nm or less and an apparent specific gravity of 70 g/L or more. The apparent specific gravity is preferably 90 g/L to 200 g/L, and more preferably 100 g/L to 200 g/L. A larger apparent specific gravity is preferred because a liquid dispersion with a high concentration may be prepared and the haze and the aggregate are improved.

These particles usually form secondary particles with an average particle diameter of 0.1 µm to 3.0 µm, and are present as an aggregate of the primary particles in a film and form unevenness of 0.1 µm to 3.0 µm on the surface of the film. The secondary average particle size is preferably 0.2 µm to 1.5 µm, more preferably 0.4 µM to 12 µm, and most preferably 0.6 µm to 1.1 µM. With respect to the primary and secondary particle diameters, particles in the film are observed under a scanning electron microscope, and the diameter of a circle circumscribing a particle is defined as the particle diameter. Furthermore, 200 particles are observed by changing the site, and the average value thereof is defined as the average particle diameter.

As the silicon dioxide particle, a commercially available product such as, for example, AEROSIL R972, R972V, R974, R812, 200, 200V, 300, R202, OX50 and TT600 (all manufactured by Nippon Aerosil Co., Ltd.) may be used. The zirconium oxide particle is commercially available under the trade name of, for example, AEROSIL R976 and R811 (both manufactured by Nippon Aerosil Co., Ltd.), and these products may be used.

Among them, AEROSIL 200V and AEROSIL R972 are particularly preferred because these particles are a silicon dioxide particle having an average primary particle diameter of 20 nm or less and an apparent specific gravity of 70 g/L or more, and provide a high effect of reducing the frictional coefficient of an optical film while maintaining a low turbidity of the optical film.

In order to obtain a polarizing plate protective film having particles with a small secondary average particle diameter in the present invention, several techniques are contemplated in preparing a dispersion of particles. For example, there is a method of preparing in advance a particle liquid dispersion in which a solvent and particles are mixed by stirring, adding the particle liquid dispersion to a small amount of a separately prepared cellulose acylate solution and dissolving the resulting solution by stirring and mixing the mixture with a main cellulose acylate solution (dope). The method is a preferred preparation method in that silicon dioxide particles may be dispersed well and hardly re-aggregated. Besides the method, there is also a method of adding a small amount of a cellulose ester to a solvent to be dissolved by stirring, adding the particles thereto to be dispersed with a dispersing machine, and using the mixture as a particle added solution to sufficiently mix the particle added solution with a dope by an in-line mixer. The present invention is not limited to these methods, but in mixing and dispersing the silicon dioxide particles in a solvent and the like, the silicon dioxide concentration is preferably 5% by mass to 30% by mass, more preferably 10% by mass to 25% by mass, and most preferably 15% by mass to 20% by mass. A higher dispersion concentration is preferred because the concentration results in a lower liquid turbidity for the addition amount, leading to reductions in haze and aggregates. The amount of the mat agent particles added in a final cellulose acylate dope solution is preferably 0.01 g per $m^3$ to 1.0 g per $m^3$, more preferably 0.03 g per $m^3$ to 0.3 g per $m^3$, and most preferably 0.08 g per $m^3$ to 0.16 g per $m^3$.

Examples of solvents used include lower alcohols, preferably such as methyl alcohol, ethyl alcohol, propyl alcohol, isopropyl alcohol and butyl alcohol. Solvents other than lower alcohols are not particularly limited, but a solvent used during the film formation of cellulose ester is preferably used.

The processes from casting to post-drying may be performed under air atmosphere and under inert gas atmosphere, such as nitrogen gas. A winding machine used in preparing the polarizing plate protective film in the present invention may be the one generally used, and the film can be wound according to a winding method, such as a constant tension method, a constant torque method, a taper tension method, and a program tension control method in which the internal stress is constant.

(Stretching Treatment)

The polarizing plate protective film may be subjected to stretching treatment. The stretching treatment allows a desired retardation to be imparted to the polarizing plate protective film. As for the stretching direction of the cellulose acylate film, any of the width direction and the longitudinal direction is preferred.

The stretching method in the width direction is described, for example, in Japanese Patent Application Laid-Open Nos. S62-115035, H4-152125, H4-284211, H4-298310 and H11-48271 and the like.

The film is stretched under heating conditions. The film may be stretched by treatment under drying, and the treatment is effective particularly when the solvent remains. In the case of stretching in the longitudinal direction, for example, the film is stretched by adjusting the speed of a film conveying roller to make the film winding speed higher than the peeling-off speed of the film. In the case of stretching in the width direction, the film may be stretched also by conveying the film while keeping the width of the film by a tenter and gradually increasing the width of the tenter. It is also possible to stretch the film using a stretching machine (preferably uniaxial stretching using a long stretching machine) after drying the film.

The glass transition temperature Tg of the polarizing plate protective film is used to stretch the polarizing plate protective film preferably at a temperature of (Tg −5° C.) to (Tg +40° C.), more preferably Tg to (Tg +35° C.), and particularly preferably (Tg +10° C.) to (Tg +30° C.). In the case of a dried film, the temperature is preferably 130° C. to 200° C.

Furthermore, when the film is stretched while the dope solvent remains after the casting, it is possible to stretch the film at a temperature lower than the temperature of the dried film, and in this case, the temperature is preferably 100° C. to 170° C.

The stretching magnification of the polarizing plate protective film (elongation ratio based on the film before stretching) is preferably 1% to 200%, and more preferably 5% to 150%. In particular, the film is preferably stretched in the width direction at 1% to 200%, more preferably 5% to 150%, and particularly preferably 10% to 45%.

The stretching speed is preferably 1%/min to 300%/min, more preferably 10%/min to 300%/min, and most preferably 30%/min to 300%/min.

Further, the polarizing plate protective film is preferably prepared by, after stretching the film to a maximum stretching magnification, subjecting the film to a process of holding the film at a stretching magnification lower than the maximum stretching magnification for a certain time (hereinafter referred to as a "relaxing process" in some cases). The stretching magnification in the relaxing process is preferably 50% to 99%, more preferably 70% to 97%, and most preferably 90% to 95%, based on the maximum stretching magnification. In addition, the time of the relaxing process is preferably 1 second to 120 seconds and more preferably 5 seconds to 100 seconds.

Furthermore, the polarizing plate protective film may be preferably prepared by including a shrinking process of shrinking the film in the width direction while gripping the film.

In the preparation method including a stretching process of stretching the film in the width direction of the film and a shrinking process of shrinking the film in the conveying direction (longitudinal direction) of the film, the film is held by a pantograph-type or linear motor-type tenter, and the gap between clips is gradually decreased in the conveying direction while stretching the film in the width direction, whereby the film may be shrunk.

In the method as described above, the stretching process and the shrinking process are at least partially performed at the same time.

Meanwhile, as a stretching apparatus for specifically performing the above-described stretching process of stretching the film either in the longitudinal direction or in the width direction, and at the same time, shrinking the film in the other direction to simultaneously increase the film thickness of the film, a FITZ machine manufactured by ICHIKIN Co., Ltd. and the like may be preferably used. This stretching apparatus is described in (Japanese Patent Application Laid-Open No. 2001-38802).

For the stretching magnification in the stretching process and the shrinking ratio in the shrinking process, an appropriate value may be arbitrarily selected according to target values of in-plane retardation (Re) and retardation (Rth) in a thickness direction, and it is preferred that the stretching magnification in the stretching process is 10% or more and the shrinking ratio in the shrinking process is 5% or more.

In particular, the method preferably includes a stretching process of stretching the film by 10% or more in the width direction and a shrinking process of shrinking the film by 5% or more in the conveying direction while gripping the film in the width direction of the film.

Meanwhile, the shrinking ratio mentioned in the present invention means a ratio of the shrunk length of the film after shrinking to the length of the film before shrinkage in the shrinking direction.

The shrinking ratio is preferably 5% to 40%, and particularly preferably 10% to 30%.

(Saponification Treatment)

The polarizing plate protective film may be imparted with adherence to a polarizer material such as polyvinyl alcohol by applying an alkali saponification treatment thereto and may be used as a polarizing plate protective film. For the saponification method, a method described in [0211] and [0212] of Japanese Patent Application Laid-Open No. 2007-86748 may be used.

For example, the alkali saponification treatment of the polarizing plate protective film is preferably performed in a cycle of immersing the surface of the film in an alkali solution, neutralizing the film with an acid solution, washing the surface with water and drying the surface. Examples of the alkali solution include a potassium hydroxide solution and a sodium hydroxide solution, and the concentration of hydroxyl ions is preferably in a range of 0.1 mol/L to 5.0 mol/L, and more preferably in a range of 0.5 mol/L to 4.0 mol/L. The alkali solution temperature is preferably in a range of room temperature to 90° C. and more preferably 40° C. to 70° C.

Instead of the alkali saponification treatment, an adhesion facilitating processing described in Japanese Patent Application Laid-Open Nos. H6-94915 and H6-118232 may be performed.

[Method for Preparing Polarizer]

The method for preparing the polarizer in the method for preparing the polarizing plate of the present invention is not particularly limited, but for example, it is preferred that the PVA is used to prepare a film, and then a dichroic molecule is introduced thereto to constitute a polarizer. The PVA film may be prepared with reference to a method as described in [0213] to [0237] of Japanese Patent Application Laid-Open No. 2007-86748, Japanese Patent No. 3342516, Japanese Patent Application Laid-Open Nos. H09-328593, 2001-302817 and 2002-144401 and the like.

Specifically, it is particularly preferred that the method for preparing the polarizer is sequentially performed in the sequence of a process of preparing a PVA-based resin solution, a casting process, a swelling process, a dyeing process, a film hardening process, a stretching process and a drying process. Further, during or after the above-described process, an on-line sheet inspection process may be included.

(Preparation of PVA-based Resin Solution)

In the process of preparing the PVA-based resin solution, it is preferred that a stock solution is prepared by dissolving a PVA-based resin in water or an organic solvent. The concentration of the polyvinyl alcohol-based resin in the stock solution is preferably 5% by mass to 20% by mass. For example, a method to put the wet-cake of PVA in a dissolver, add a plasticizer and water thereto if necessary, and stir the dissolver while blowing in water steam from the bottom of the dissolver is preferred. The internal resin temperature is preferably achieved by warming the dissolver at 50° C. to 150° C., and the inside of the system may be pressurized.

In addition, an acid may or may not be added to the polarizer, but in the case of adding the acid thereto, it is preferred to add the acid in the process of preparing the PVA-based resin solution. Meanwhile, in the case of adding an acid to the polarizer, the organic acid included in the polarizing plate protective film may also be used.

(Casting)

As the casting process, a method for casting a stock solution of the PVA-based resin solution prepared above to form a film is generally preferably used. The casting method is not particularly limited, but it is preferred that the heated stock solution of the PVA-based resin solution is supplied to a biaxial extruder and cast from a discharge means (preferably a die and more preferably a T-type slit die) on a support by a gear pump to form a film. In addition, the temperature of the resin solution discharged from the die is not particularly limited.

As the support, a cast drum is preferred, and the diameter, width, rotation speed and surface temperature of the drum are not particularly limited.

Thereafter, it is preferred that drying is performed while alternately passing the rear side and surface of the obtained roll through the drying roll.

(Swelling)

The swelling process is preferably performed with only water, but as described in Japanese Patent Application Laid-Open No. H10-153709, in order to stabilize the optical performance and prevent the generation of wrinkles of a polarizing plate substrate in a production line, the degree of swelling of the polarizing plate base material may be managed by allowing a boric acid aqueous solution to swell the polarizing plate substrate.

Furthermore, the temperature and time of the swelling process may be arbitrarily set, but is preferably 10° C. to 60° C. and 5 seconds to 2,000 seconds, respectively.

Meanwhile, the film may be slightly stretched during the swelling process, and for example, an aspect of stretching the film by approximately 1.3 times is preferred.

(Dyeing)

For the dyeing process, a method as described in Japanese Patent Application Laid-Open No. 2002-86554 may be used. Further, as a dyeing method, it is possible to use any means such as immersion, application or spraying of iodine or a dyeing solution, and the like. In addition, as described in Japanese Patent Application Laid-Open No. 2002-290025, it is possible to use the concentration of iodine, the temperature of a dye bath, the stretching magnification in the bath and a method for performing dyeing while stirring a bath solution in the bath.

When a higher iodine ion is used as the dichroic molecule, it is preferred that the dyeing process uses a solution obtained by dissolving iodine in a potassium iodide aqueous solution in order to obtain a polarizing plate of high contrast. In this case, as the mass ratio of iodine and potassium iodide in the iodine-potassium iodide aqueous solution, an aspect as described in Japanese Patent Application Laid-Open No. 2007-086748 may be used.

Furthermore, as described in Japanese Patent No. 3145747, a boron-based compound such as boric acid, borax and the like may be added to a dyeing solution.

(Hardened Film)

In the film hardening process, a crosslinking agent is preferably contained by immersion in a crosslinking agent solution or applying the solution. Further, as described in Japanese Patent Application Laid-Open No. H11-52130, the film hardening process may be performed by dividing the process several times.

As the crosslinking agent, a crosslinking agent described in U.S. Reissue Pat. No. 232897 may be used, and as described in Japanese Patent No. 3357109, a polyvalent aldehyde may be used as the crosslinking agent in order to improve the dimensional stability, but boric acids are most preferably used. When boric acid is used as the crosslinking agent used in the film hardening process, a metal ion may be added to the boric acid-potassium iodide aqueous solution. As the metal ion, zinc chloride is preferred, but as described in Japanese Patent Application Laid-Open No. 2000-35512, a zinc halide such as zinc iodide and the like and a zinc salt such as zinc sulfate, zinc acetate and the like may be used instead of zinc chloride.

In addition, the film may be hardened by preparing a boric acid-potassium iodide aqueous solution to which zinc chloride is added and immersing a PVA film in the solution, and it is possible to use a method as described in Japanese Patent Application Laid-Open No. 2007-086748.

Meanwhile, as a method for improving durability under high temperature environments, an immersion treatment by a known acid solution may or may not be performed. Examples of the treatment by the acid solution include methods as described in Japanese Patent Application Laid-Open Nos. 2001-83329 and H6-254958, International Publication No. WO2006/095815 and the like.

(Stretching)

The stretching process may preferably use a longitudinal uniaxial stretching system as described in U.S. Pat. No. 2,454,515, or a tenter system as described in Japanese Patent Application Laid-Open No. 2002-86554. The preferred stretching magnification is 2 times to 12 times, and more preferably 3 times to 10 times. Furthermore, it may also be preferred that the relationship among the stretching magnification, the thickness of the raw fabric and the thickness of the polarizer is regulated at [(thickness of polarizer after adhering the protective film/thickness of raw film for forming polarizer)×(total stretching magnification)>0.17] as described in Japanese Patent Application Laid-Open No. 2002-040256, or that the relationship between the width of the polarizer at the time of leaving a bath finally and the width of the polarizer at the time of adhering the protective film is regulated at [0.80 (width of the polarizer at the time of adhering the protective film/width of the polarizer at the time of leaving a bath finally) ≤0.95] as described in Japanese Patent Application Laid-Open No. 2002-040247.

(Drying)

The drying process may use a method known in Japanese Patent Application Laid-Open No. 2002-86554, a preferred temperature range is 30° C. to 100° C., and a preferred drying time is 30 seconds to 60 minutes. Further, it is also preferred to perform a thermal treatment in which the discoloration temperature in water is 50° C. or higher as described in Japanese Patent No. 3148513, or aging in an atmosphere in which the temperature and relative humidity are controlled as described in Japanese Patent Application Laid-Open No. H07-325215 or Japanese Patent Application Laid-Open No. H07-325218.

It is preferred that a polarizer having a thickness of 10 μm to 200 μm is prepared by the process. Meanwhile, the thickness may be controlled by a known method, and may be controlled, for example, by setting the width of a die slit or stretching conditions in the casting process to appropriate values.

<Method for Stacking Polarizer and Polarizing Plate Protective Film>

According to the method for preparing the polarizing plate of the present invention, two polarizing plate protective films are stacked on both sides of the polarizer as obtained above.

In the method for preparing the polarizing plate of the present invention, it is preferred that the polarizing plate is prepared by a method including: subjecting a polarizing plate protective film to alkali treatment and adhering the polarizing plate protective film to both sides of a polarizer prepared by immersion stretching a polyvinyl alcohol film in an iodine solution by using a completely saponified polyvinyl alcohol aqueous solution.

Examples of an adhesion bond used in adhering the treated surface of the polarizing plate protective film and the polarizer include a polyvinyl alcohol-based adhesion bond, such as polyvinyl alcohol and polyvinyl butyral, a vinyl-based latex, such as butyl acrylate, or the like.

In the method for adhering the polarizing plate protective film of the polarizing plate of the present invention to the polarizer, it is preferred that the transmission axis of the polarizer and the slow axis of the polarizing plate protective film are attached to each other such that both are substantially parallel.

Here, substantially parallel means that in the direction of nx of the main refractive index of the polarizing plate protective film containing the organic acid and the direction of the transmission axis of the polarizing plate, the deviation thereof is within 5°, and within 1° and preferably within 0.5°. When the deviation is within 1°, it is difficult to reduce the performance of the polarization even under the polarizing plate cross-nicol and to generate the light leakage, which is preferred.

<Functionalization of Polarizing Plate>

The polarizing plate of the present invention is preferably used as a functionalized polarizing plate complexed with an antireflection film for improving the visibility of a display, a luminance improving film or an optical film having a functional layer such as a hard coat layer, a forward scattering layer and an antiglare (prevention of glaring) layer. An antireflection film, a luminance improving film, another functional optical film, a hard coat layer, a forward scattering layer and an antiglare layer for functionalization are described in [0257] to [0276] of Japanese Patent Application Laid-Open No. 2007-86748, and a functionalized polarizing plate may be prepared based on the description thereof.

(3-1) Antireflection Film

The polarizing plate of the present invention may be used in combination with an antireflection film. As the antireflection film, it is possible to use any of a film having a reflectance of about 1.5%, in which only a single layer made of a low refractive index material such as a fluorine-based polymer is imparted or a film having a reflectance of 1% or less using multilayered interference of a thin film. In the present invention, a configuration is preferably used, in which a low refractive index layer and at least one layer having a refractive index higher than the low refractive index layer (that is, a high refractive index layer and a medium refractive index layer) are stacked on a transparent support. In addition, antireflection films described in Nitto Technical Report, Vol. 38, No. 1, May 2000, pages 26 to 28, Japanese Patent Application Laid-Open No. 2002-301783 or the like may also be preferably used.

The refractive index of each layer satisfies the following relationship.

Refractive index of high refractive index layer>refractive index of medium refractive index layer>refractive index of transparent support>refractive index of low refractive index layer As the transparent support used in the antireflection film, a transparent polymer film that is used in the protective film of the above-described polarizer may be preferably used.

The refractive index of the low refractive index layer is preferably 1.20 to 1.55, and more preferably 1.30 to 1.50. The low refractive index layer is preferably used as an outermost layer having scratch resistance and antifouling properties. In order to improve the scratch resistance, it is preferably performed to impart slipperiness to the surface by using a material such as a silicon-containing compound containing a silicon group, a fluorine-containing compound containing fluorine or the like.

As the fluorine-containing compound, compounds described in, for example, [0018] to [0026] of Japanese Patent Application Laid-Open No. H9-222503, [0019] to [0030] of Japanese Patent Application Laid-Open No. H11-38202, [0027] to [0028] of Japanese Patent Application Laid-Open No. 2001-40284, Japanese Patent Application Laid-Open No. 2000-284102 and the like may be preferably used.

The silicon-containing compound is preferably a compound having a polysiloxane structure, but reactive silicones (for example, SILAPLANE (manufactured by Chisso Corporation), polysiloxanes containing a silanol group at both terminals thereof (Japanese Patent Application Laid-Open No. H11-258403) or the like may also be used. An organometallic compound such as silane coupling agents and the like and a silane coupling agent containing a specific fluorine-containing hydrocarbon group may be cured by a condensation reaction in the presence of a catalyst (compounds as described in Japanese Patent Application Laid-Open Nos. S58-142958, S58-147483 and S58-147484, Japanese Patent Application Laid-Open Nos. H9-157582 and H11-106704, and Japanese Patent Application Laid-Open Nos. 2000-117902, 2001-48590, and 2002-53804, and the like).

In the low refractive index layer, a filler (for example, a low refractive index inorganic compound having an average primary particle size of 1 nm to 150 nm, such as silicon dioxide (silica) and fluorine-containing particles (magnesium fluoride, calcium fluoride, and barium fluoride), organic particles described in [0020] to [0038] of Japanese Patent Application Laid-Open No. H11-3820, and the like), a silane coupling agent, a lubricant, a surfactant, and the like may be preferably contained as additives other than the above-described compounds.

Though the low refractive index layer may be formed by a vapor phase method (a vacuum vapor deposition method, a sputtering method, an ion plating method, a plasma CVD method and the like), the low refractive index layer is preferably formed by a coating method in that the layer may be prepared at a low cost. As the coating method, a dip coating method, an air knife coating method, a curtain coating method, a roller coating method, a wire bar coating method, a gravure coating method and a micro gravure method may be preferably used.

The thickness of the low refractive index layer is preferably 30 nm to 200 nm, more preferably 50 nm to 150 nm, and most preferably 60 to 120 nm.

It is preferred that the medium refractive index layer and the high refractive index layer are each constructed by dispersing a high refractive index inorganic compound superfine particle having an average particle size of not more than 100 nm in a matrix material. As the high refractive index inorganic compound particle, an inorganic compound having a refractive index of 1.65 or more, for example, oxides of Ti, Zn, Sb, Sn, Zr, Ce, Ta, La, In and the like, composite oxides containing such a metal atom and the like may be preferably used.

Such a superfine particle may be used in an aspect of treating the particle surface with a surface treating agent (silane coupling agents and the like: Japanese Patent Application Laid-Open Nos. H11-295503 and H11-153703 and Japanese Patent Application Laid-Open No. 2000-9908, anionic compounds or organometallic coupling agents: Japanese Patent Application Laid-Open No. 2001-310432, and the like), an aspect of adopting a core-shell structure using the high refractive index particle as a core (Japanese Patent Application Laid-Open No. 2000-166104 and the like), an aspect of using a specific dispersant in combination (for example, Japanese Patent Application Laid-Open No. H11-153703, U.S. Pat. No. 6,210,858B1, Japanese Patent Application Laid-Open No. 2002-2776069 and the like), and the like.

As the matrix material, thermoplastic resins, curable resin films and the like conventionally known may be used, and polyfunctional materials described in Japanese Patent Application Laid-Open Nos. 2000-47004, 2001-315242, 2001-31871, 2001-296401 and the like, or curable films obtained from a metal alkoxide composition described in Japanese Patent Application Laid-Open No. 2001-293818 and the like may also be used.

The refractive index of the high refractive index layer is preferably 1.70 to 2.20. The thickness of the high refractive index layer is preferably 5 nm to 10 μm, and more preferably 10 nm to 1 μm.

The refractive index of the medium refractive index layer is adjusted to be a value between the refractive index of the low refractive index layer and the refractive index of the high refractive index layer. The refractive index of the medium refractive index layer is preferably 1.50 to 1.70.

The haze of the antireflection film is preferably 5% or less, and more preferably 3% or less. Furthermore, the strength of the film is preferably H or more, more preferably 2H or more, and most preferably 3H or more by a pencil hardness test in accordance with JIS K5400.

(3-2) Luminance Improving Film

The polarizing plate of the present invention may be used in combination with a luminance improving film. The luminance improving film has a function that separates circularly polarized light or linearly polarized light, and is disposed between a polarizing plate and a backlight to backwardly reflect or backwardly scatter the one-sided circularly polarized light or linearly polarized light into the backlight side. When the light reflected again from the backlight part partially changes the polarization state and comes again into the luminance improving film and the polarizing plate, the light is partially transmitted, and thus, by repeating this process, the light availability is improved and the front luminance is improved about 1.4 times more. As the luminance improving film, an anisotropic reflection system and an anisotropic scattering system are known, and any of them may be combined with the polarizing plate in the present invention.

In the anisotropic reflection system, a luminance improving film in which a uniaxially stretched film and an unstretched film are stacked in a multiple manner to make a difference in the refractive index in the stretching direction large, thereby having anisotropy of the reflectance and transmittance is known, and there is known a multilayered film mode using the principle of a dielectric mirror (described in International Publication Nos. WO 95/17691, WO 95/17692 and WO 95/17699) or a cholesteric liquid crystal mode (described in European Patent No. 606940A2 and Japanese Patent Application Laid-Open No. 8-271731). In the present invention, DBEF-E, DBEF-D and DBEF-M (all of which are manufactured by 3M Corporation) may be preferably used as the luminance improving film of a multilayered system using the principle of a dielectric mirror, and NIPOCS (manufactured by Nitto Denko Corporation) may be preferably used as the luminance improving film of a cholesteric liquid crystal mode. With respect to NIPOCS, Nitto Technical Report, Vol. 38, No. 1, May 2000, pages 19 to 21 and the like may be made herein by reference.

Further, it is also preferred to use the polarizing plate of the present invention in combination with a luminance improving film of an anisotropic scattering system obtained by blending a positive intrinsic birefringent polymer and a negative intrinsic birefringent polymer and uniaxially stretching the blend as described in International Publication Nos. WO 97/32223, WO 97/32224, WO 97/32225 and WO 97/32226, and Japanese Patent Application Laid-Open Nos. H9-274108 and H11-174231. As the luminance improving film of an anisotropic scattering system, DRPF-H (manufactured by 3M Corporation) is preferred.

It is also preferred that the polarizing plate of the present invention is used in combination with a functional optical film provided with a hard coat layer, a forward scattering layer, an antiglare (prevention of glaring) layer, a gas barrier layer, a lubricating layer, an antistatic layer, an undercoating layer, a protective layer or the like. In addition, it is also preferred to use the functional layers mutually complexed with the antireflection layer in the above-described antireflection film, the optically anisotropic layer or the like in the same layer. The functional layers may be provided on either one surface of or both the surfaces of the polarizer side and the opposite surface to the polarizer (the surface closer to the air side) and used.

(3-3) Hard Coat Layer

In order to impart a dynamic strength such as scratch resistance, it is preferred that the polarizing plate of the present invention is combined with a functional optical film having a hard coat layer formed on the surface of the transparent support. When the hard coat layer is applied to the above-described antireflection film, it is especially preferred to provide the hard coat layer between the transparent support and the high refractive index layer.

It is preferred that the hard coat layer is formed by a crosslinking reaction of a curable compound by light and/or heat or a polymerization reaction. As a curable functional group, a photopolymerizable functional group is preferred, and as a hydrolyzable functional group-containing organometallic compound, an organic alkoxysilyl compound is preferred. As a specific constituent composition of the hard coat layer, those described in, for example, Japanese Patent Application Laid-Open Nos. 2002-144913 and 2000-9908, International Publication No. WO 00/46617 and the like may be preferably used.

The thickness of the hard coat layer is preferably 0.2 μm to 100 μm.

The strength of the hard coat layer is preferably H or more, more preferably 2H or more and most preferably 3H or more by a pencil hardness test in accordance with JIS K5400. Furthermore, it is preferred that the amount of abrasion of a test specimen before and after the test in the Taber test in accordance with JIS K5400 is as small as possible.

As a material for forming the hard coat layer, a compound containing an ethylenically unsaturated group and a compound containing a ring opening polymerizable group may be used, and these compounds can be used either alone or in combination. Preferred examples of the compound containing an ethylenically unsaturated group include polyacrylates of a polyol, such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate; epoxy acrylates, such as diacrylate of bisphenol A diglycidyl ether and diacrylate of hexanediol diglycidyl ether; urethane acrylates obtained by a reaction of a polyisocyanate and a hydroxyl group-containing acrylate such as hydroxyethyl acrylate, and the like. Further, EB-600, EB-40, EB-140, EB-1150, EB-1290K, IRR214, EB-2220, TMPTA, TMPTMA (all of which are manufactured by DAICEL-UCB Company, Ltd.), UV-6300, UV-1700B (all of which are manufactured by Nippon Synthetic Chemical Industry Co., Ltd.) and the like are exemplified as commercially available products.

In addition, preferred examples of the compound containing a ring opening polymerizable group include glycidyl ethers, such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ether of a cresol novolak resin and polyglycidyl ether of a phenol novolak resin, alicyclic epoxys, such as CELLOXIDE 2021P, CELLOXIDE 2081, EPOLEAD GT-301, EPOLEAD GT-401 and EHPE3150CE (all of which are manufactured by Daicel Chemical Industries, Ltd.), polycyclohexyl epoxy methyl ether of a phenol novolak resin), oxetanes, such as OXT-121, OXT-221, OX-SQ and PNOX-1009 (all of which are manufactured by TOAGOSEI Co., Ltd.), and the like. Besides, polymers of glycidyl (meth)acrylate or copolymers of glycidyl (meth)acrylate and a copolymerizable monomer may be used in the hard coat layer.

In order to lower hardening and shrinkage of the hard coat layer, improve adhesion to a base material, and lower curl of a hard coat-treated article in the present invention, it is preferably performed that a crosslinked particle, such as an oxide particle of silicon, titanium, zirconium and aluminum, or an organic particle, such as a crosslinked particle of polyethylene, polystyrene, a poly(meth)acrylic acid esters and polydimethylsiloxane, and a crosslinked rubber particle of SBR, NBR and the like is added to the hard coat layer. The average particle size of these crosslinked fine particles is preferably 1 nm to 20,000 nm. Furthermore, as the shape of the crosslinked fine particle, spherical, rod-like, acicular, tabular shapes and the like may be used without any particular limitation. The amount of particles added is preferably 60% by volume or less, and more preferably 40% by volume or less of the hard coat layer after hardening.

When the above-described inorganic particle is added, the inorganic fine particle is generally poor in compatibility with a binder polymer, and thus it is preferred that the inorganic fine particle is subjected to a surface treatment with a surface treating agent containing a metal, such as silicon, aluminum and titanium and having a functional group, such as an alkoxide group, a carboxylic acid group, a sulfonic acid group and a phosphonic acid group.

It is preferred that the hard coat layer is cured by using heat or active energy rays, among them, it is more preferred to use active energy rays, such as radiations, gamma rays, alpha rays, electron beams and ultraviolet rays, and in consideration of stability and productivity, it is particularly preferred to use electron beams or ultraviolet rays. In the case of performing curing by heat, the heating temperature is preferably 140° C. or less and more preferably not higher than 100° C. or less, in consideration of the heat resistance of the plastic itself.

(3-4) Forward Scattering Layer

The forward scattering layer is used for improving the viewing angle characteristic in the up and down and right and left directions (hue and luminance distribution) when applying the polarizing plate in the present invention to a liquid crystal display device. In the present invention, the forward scattering layer preferably has a configuration in which particles having different refractive indices are dispersed in a binder. It is possible to use, for example, a configuration in which a coefficient of forward scattering is specified as described in Japanese Patent Application Laid-Open No. H11-38208, a configuration in which a relative refractive index between a transparent resin and a particle is made to fall within a specified range as described in Japanese Patent Application Laid-Open No. 2000-199809, a configuration in which the haze value is specified at 40% or more as described in Japanese Patent Application Laid-Open No. 2002-107512, and the like. Further, in order to control the viewing angle characteristic of haze, the polarizing plate of the present invention may also be preferably combined with "LUMIS-TRY" as described on pages 31 to 39 of Technical Report "Photo-functional Films" of Sumitomo Chemical Co., Ltd.

(3-5) Antiglare Layer

The antiglare (prevention of glaring) layer is used in order to prevent reflected light from being scattered and glared. An antiglare function is obtained by forming unevenness on the uppermost surface (display side) of the liquid crystal display device. The haze of an optical film having an antiglare function is preferably 3% to 30%, more preferably 5% to 20%, and most preferably 7% to 20%.

As a method for forming unevenness on the film surface, for example, it is preferred to use a method for adding a particle to form unevenness on the film surface (for example, Japanese Patent Application Laid-Open 2000-271878 and the like), a method for adding a small amount (0.1% by mass to 50% by mass) of a relatively large particle (particle size of 0.05 μm to 2 μm) to form a film having an uneven surface (for example, Japanese Patent Application Laid-Open Nos. 2000-281410, 2000-95893, 2001-100004, 2001-281407 and the like), a method for physically transferring an unevenness shape onto the film surface (for example, an embossing method described in Japanese Patent Application Laid-Open Nos. S63-278839 and H11-183710, Japanese Patent Application Laid-Open No. 2000-275401 and the like); and the like.

[Liquid Crystal Display Device]

Subsequently, the liquid crystal display device of the present invention will be described.

The liquid crystal display device of the present invention includes at least one polarizing plate of the present invention.

FIG. 1 is a schematic view illustrating an example of a liquid crystal display device of the present invention. In FIG. 1, a liquid crystal display device 10 includes a liquid crystal cell having a liquid crystal layer 5, a liquid crystal cell upper electrode substrate 3 disposed above and below the liquid crystal layer 5 and a liquid crystal cell lower electrode substrate 6, and an upper polarizing plate 1 and a lower polarizing plate 8 disposed on both sides of the liquid crystal cell. A cooler filter may be disposed between the liquid crystal cell and each polarizing plate. When the liquid crystal display device 10 is used as a transmission type, a cold cathode or hot cathode fluorescent tube, or a backlight using a light-emitting diode, a field emission element or an electro-luminescent element as a light source is disposed on the back side.

Each of the upper polarizing plate 1 and the lower polarizing plate 8 has a configuration in which two polarizing plate protective films are stacked to interpose a polarizer therebetween, and it is preferred that at least one polarizing plate of the liquid crystal display device 10 of the present invention is the polarizing plate of the present invention. In the liquid crystal display device 10 of the present invention, it is preferred that a general transparent protective film, a polarizer and the polarizing plate protective film are stacked in this order from the outer side (side far from the liquid crystal cell) of the device.

The liquid crystal display device 10 includes an image direct-view type, an image projection type and a light modulation type. The present invention is effective for an active matrix liquid crystal display device using a 3-terminal or 2-terminal semiconductor element, such as TFT or MIM. Of course, the present invention is effective also for a passive matrix liquid crystal display device as represented by an STN mode called a time-division driving.

(VA Mode)

The liquid crystal cell of the liquid crystal display device of the present invention is preferably a VA-mode liquid crystal cell.

The VA-mode liquid crystal cell is manufactured by subjecting a liquid crystal having a negative dielectric anisotropy on the order of $\Delta n=0.0813$ and $\delta \in =-4.6$ between upper and lower substrates to rubbing orientation such that the director indicating the alignment direction of liquid crystal molecules, so-called a tilt angle, becomes about 89°. In FIG. 1, the thickness d of the liquid crystal layer 5 is preferably set to about 3.5 μm. Here, the brightness at the time of white display varies depending on the size of the product $\delta nd$ of thickness d and refractive index anisotropy $\delta n$. For this reason, the thickness of the liquid crystal layer is set to be in a range of 0.2 μm to 0.5 μm in order to obtain maximum brightness.

The polarizing plates are stacked such that the absorption axis 2 of the liquid crystal cell upper polarizing plate 1 and the absorption axis 9 of the lower polarizing plate 8 cross at approximately right angles. A transparent electrode (not illustrated) is formed on the inner side of each orientation film of the liquid crystal cell upper electrode substrate 3 and the liquid crystal cell lower electrode substrate 6, and in the non-driven state where a driving voltage is not applied to the electrodes, the liquid crystal molecules in the liquid crystal layer 5 are oriented in an alignment approximately vertical to the substrate surface, and as a result, the polarization state of light passing through the liquid crystal panel is scarcely changed. That is, the liquid crystal display device realizes an ideal black display in the non-driven state. In contrast, in the driven state, the liquid crystal molecules are tilted to the direction parallel to the substrate surface, and the polarization state of light passing through the liquid crystal panel is changed by these tilted liquid crystal molecules. In other words, in the liquid crystal display device, a white display may be obtained in the driven state. Meanwhile, in FIG. 1, reference numerals 4 and 7 indicate the alignment control direction.

Here, an electric field is applied between the upper and lower substrates, and thus, a liquid crystal material having a negative dielectric anisotropy is preferably used such that the liquid crystal molecule responds vertically with respect to the electric field direction. In addition, when the electrodes are disposed on one substrate and the electric field is applied in the transverse direction parallel to the substrate surface, a liquid crystal material having a positive dielectric anisotropy is used.

Furthermore, in the VA-mode liquid crystal display device, the addition of a chiral agent, which is generally used in a TN-mode liquid crystal display device, causes deterioration in the dynamic response characteristics, and thus, the chiral agent is used less often but may be added in order to reduce the alignment failure in some cases.

The characteristics of the VA-mode are high-speed response and high contrast. However, this mode has a problem in that the contrast is high in the front, but deteriorates in the oblique direction. At the time of black display, the liquid crystal molecules are oriented in an alignment vertical to the substrate surface. When viewed from the front, the liquid crystal molecule has almost no birefringence, and thus, transmittance is low, and high contrast may be obtained. However, when viewed from an oblique direction, birefringence is produced in the liquid crystal molecule. Further, the crossing angle between absorption axes of the upper and lower polarizing plates is a right angle of 90° when viewed from the front, but exceeds 90° when viewed from the oblique direction. Because of these two factors, light leakage occurs in the oblique direction and the contrast decreases. When the polarizing plate protective film containing the organic acid is a phase difference film, the polarizing plate protective film may be disposed as an optically compensatory sheet (phase difference film) in order to solve this problem.

In addition, at the time of white display, the liquid crystal molecules are tilted, but the size of birefringence of the liquid crystal molecule when viewed from the oblique direction differs between the tilted direction and the opposite direction, and thus, there arises a difference in the brightness or color tone. In order to solve this problem, it is also preferred to adopt a structure called multi-domain, where one pixel of the liquid crystal display device is divided into a plurality of regions.

(Multi-domain)

For example, in the VA mode, the liquid crystal molecules are tilted in a plurality of different regions within one pixel by applying an electric field, whereby the viewing angle characteristics are averaged. In order to divide the orientation within one pixel, a slit or protrusion is formed on the electrode to change the electric field direction or allow the electric-field density to have a gradient. In order to obtain a uniform viewing angle in all the directions, the number of divided regions needs to be increased, and a uniform viewing angle may be obtained by the division into 4 regions or 8 or more regions. In particular, when divided into 8 regions, the angle formed by absorption axes of the polarizing plates may be arbitrarily set, which is preferred.

Furthermore, it is difficult for the liquid crystal molecule to respond on the border between regions created by the division of orientation. For this reason, black display is maintained at the time of normal black display, thereby causing a problem in that the brightness is reduced. Therefore, the boundary region may be decreased by adding a chiral agent to the liquid crystal material.

EXAMPLES

Hereinafter, the present invention will be described in more detail with reference to Examples. The materials, reagents, mass amounts and ratios of substances, operations and the like shown in the following Examples may be appropriately modified as long as they do not depart from the spirit of the present invention. Therefore, the scope of the present invention is not limited to the following specific examples.

Reference Example 101

(1) Formation of Cellulose Acylate Film (<Preparation of Cellulose Acylate>)

A cellulose acylate having a degree of acetyl substitution of 2.87 was prepared. Sulfuric acid (7.8 parts by mass based on 100 parts by mass of cellulose) was added as a catalyst, and carboxylic acid was added as a raw material of an acyl substituent to perform an acylation reaction at 40° C. Further, the mixture was aged at 40° C. after the acylation. In addition, low-molecular weight components of the cellulose acylate were removed by washing with acetone.

[Preparation of Polarizing Plate Protective Film]

<Preparation of Dope 101 for Surface Layer on Air Side>

(Preparation of Cellulose Acylate Solution)

The following compositions were introduced into a mixing tank and stirred to dissolve each component, thereby preparing a cellulose acylate solution 1.

| Composition of cellulose acylate solution 1 | |
|---|---|
| Cellulose acylate having a degree of acetyl substitution of 2.87 and a degree of polymerization of 370 | 100.0 parts by mass |
| Sucrose octabenzoate | 11.0 parts by mass |
| Polarizer durability enhancer (2-3) | 4.0 parts by mass |
| Methylene chloride (first solvent) | 353.9 parts by mass |
| Methanol (second solvent) | 89.6 parts by mass |
| n-Butanol (third solvent) | 4.5 parts by mass |

(Preparation of Mat Agent Solution 2)

The following compositions were introduced into a disperser and stirred to dissolve each component, thereby preparing a mat agent solution 2.

| Composition of mat agent solution 2 | |
|---|---|
| Silica particle having an average particle size of 20 nm (AEROSIL R972, manufactured by Nippon Aerosil Co., Ltd.) | 2.0 parts by mass |
| Methylene chloride (first solvent) | 69.3 parts by mass |
| Methanol (second solvent) | 17.5 parts by mass |
| n-butanol (third solvent) | 0.9 parts by mass |
| Cellulose acylate solution 1 | 0.9 parts by mass |

1.3 parts by mass of the mat agent solution 2 and 98.7 parts by mass of the cellulose acylate solution 1 were added, and the mixture was mixed by using an in-line mixer to prepare a dope 101 for a surface layer on the air side.

<Preparation of Dope 101 for Base Layer>

(Preparation of Cellulose Acylate Solution)

The following compositions were introduced into a mixing tank and stirred to dissolve each component, thereby preparing a dope 101 for a base layer.

| Composition of dope 101 for base layer (cellulose acylate solution 2) | |
|---|---|
| Cellulose acetate having a degree of acetyl substitution of 2.87 and a degree of polymerization of 370 | 100.0 parts by mass |
| Sucrose octabenzoate | 11.0 parts by mass |
| Polarizer durability enhancer (2-3) | 4.0 parts by mass |
| The following ultraviolet absorber C | 2.0 parts by mass |
| Methylene chloride (first solvent) | 297.7 parts by mass |
| Methanol (second solvent) | 75.4 parts by mass |
| n-Butanol (third solvent) | 3.8 parts by mass |

Ultraviolet absorber C

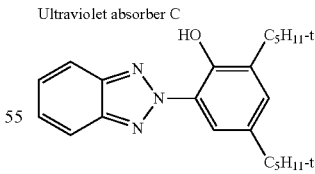

<Preparation of Dope 101 for Surface Layer on Support Side>

1.3 parts by mass of the mat agent solution 2 and 99.3 parts by mass of the cellulose acylate solution 101, which were prepared in the dope 101 for a surface layer on the air layer side, were added and the mixture was mixed by using an in-line mixer to prepare a dope 101 for a surface layer on the support side.

(Casting)

A drum casting device was used to uniformly cast three layers of the prepared dope (dope for a base layer) and a dope for a surface layer on both sides thereof onto a casting support (support temperature of −9° C.) made of stainless steel from a casting nozzle simultaneously. The film was peeled off in a state where the amount of the remaining solvent in the dope of each layer was approximately 70% by mass and dried while being stretched by 1.28 times in the transverse direction in a state where the amount of the remaining solvent was 3% by mass to 5% by mass while fixing both ends of the film in the width direction with a pin tenter. Thereafter, the film was conveyed between rolls of a thermal treatment device and further dried to obtain the cellulose acylate film of Reference Example 101. The thickness of the obtained cellulose acylate film was 30 μm (Surface layer on the air side 3 μm, base layer 24 μm and surface layer on the support side 3 μm) and the width was 1480 mm.

Reference Examples 102 to 122

Polarizing plate protective films of Reference Examples 102 to 122 were prepared in the same manner as in Reference Example 101, except that the kind and addition amount of polarizer durability enhancer and the film thickness in the preparation of the polarizing plate protective film in Reference Example 101 were changed as described in the following Table 1. Meanwhile, the kind and addition amount of polarizer durability enhancer were all the same in the three layers of the air side surface layer, the base layer and the support side surface layer.

In addition, the thickness of 37 μm in Reference Example 102 included the air side surface layer of 3 μm, the base layer of 31 μm and the support side surface layer of 3 μm.

Similarly, the thickness of 25 μm in Reference Example 110 included the air side surface layer of 2 μm, the base layer of 21 μm and the support side surface layer of 2 μm.

Similarly, the thickness of 45 μm in Reference Example 112 included the air side surface layer of 2 μm, the base layer of 41 μm and the support side surface layer of 2 μm.

TABLE 1

| | | | Polarizer durability enhancer | | | | |
|---|---|---|---|---|---|---|---|
| | Kind | Molecular weight | Number of aromatic rings | Molecular weight/Number of aromatic rings | Number of hydrogen-donating groups capable of forming a hydrogen bond | Addition amount* (parts by mass) | Thickness (μm) |
| Reference example 101 | (2-3) | 294 | 2 | 147 | 1 | 4.0 | 30 |
| Reference example 102 | (2-3) | 294 | 2 | 147 | 1 | 4.0 | 37 |
| Reference example 103 | (2-3) | 294 | 2 | 147 | 1 | 2.0 | 30 |
| Reference example 104 | (2-3) | 294 | 2 | 147 | 1 | 6.0 | 30 |
| Reference example 105 | (2-3) | 294 | 2 | 147 | 1 | 8.0 | 30 |
| Reference example 106 | (2-2) | 232 | 1 | 232 | 1 | 4.0 | 30 |
| Reference example 107 | (2-4) | 286 | 1 | 286 | 1 | 4.0 | 30 |
| Reference example 108 | (2-5) | 280 | 2 | 140 | 1 | 4.0 | 30 |
| Reference example 109 | (2-1) | 204 | 1 | 204 | 2 | 4.0 | 30 |
| Reference example 110 | (2-3) | 294 | 2 | 147 | 1 | 6.0 | 25 |
| Reference example 111 | None | — | — | — | — | 0.0 | 30 |
| Reference example 112 | (2-3) | 294 | 2 | 147 | 1 | — | 45 |
| Reference example 113 | Plasticizer A | 404 | 3 | 135 | 0 | 4.0 | 30 |
| Reference example 114 | Plasticizer B | 280 | 1 | 280 | 0 | 4.0 | 30 |
| Reference example 115 | Plasticizer C | 326 | 3 | 109 | 0 | 4.0 | 30 |
| Reference example 116 | Plasticizer D | 553 | 4 | 138 | 0 | 4.0 | 30 |
| Reference example 117 | Plasticizer E | 316 | 1 | 316 | 1 | 4.0 | 30 |
| Reference example 118 | (2-3) | 294 | 2 | 147 | 1 | 18.0 | 30 |
| Reference example 119 | (2-3) | 294 | 2 | 147 | 1 | 25.0 | 30 |
| Reference example 120 | A-2 | 370 | 3 | 123 | 1 | 6.0 | 30 |
| Reference example 121 | A-7 | 384 | 3 | 128 | 1 | 6.0 | 30 |
| Reference example 122 | A-24 | 384 | 3 | 128 | 1 | 6.0 | 30 |

*represents an addition amount based on 100 parts by mass of cellulose acylate.

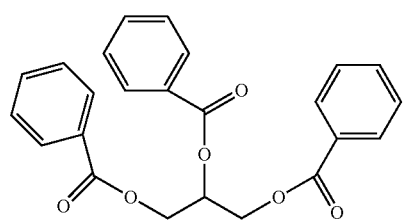

Plasticizer A

A plasticizer used in the Examples of Japanese Patent Application Laid-Open No. 2007-47536

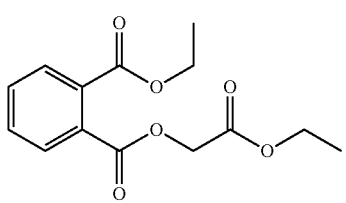

Plasticizer B

A plasticizer used in the Examples of Japanese Patent Application Laid-Open No. 2007-47536

Plasticizer C

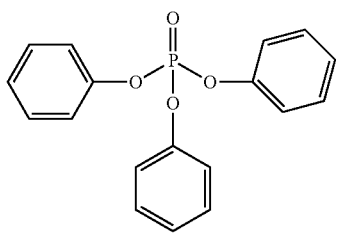

A plasticizer used in the Examples of International Publication No. 07/007,565

Plasticizer D

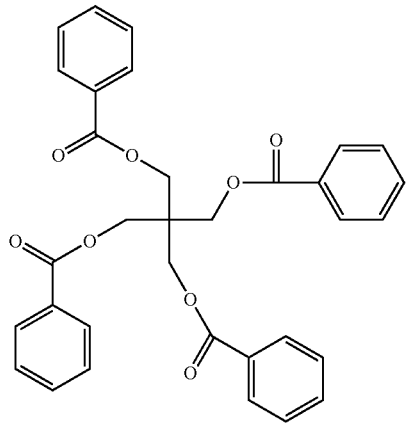

A plasticizer used in the Examples of International Publication No. WO07/007,565

Plasticizer E

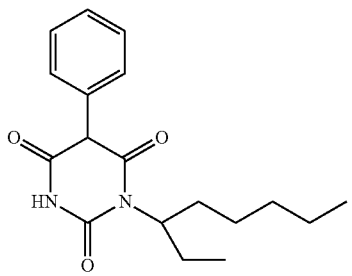

Reference Example 201

(1) Formation of Cellulose Acylate Film

<Preparation of Cellulose Acylate>

A cellulose acylate having a degree of acetyl substitution of 2.87 was prepared. Sulfuric acid (7.8 parts by mass based on 100 parts by mass of cellulose) was added as a catalyst and carboxylic acid was added as a raw material of an acyl substituent to perform an acylation reaction at 40° C. Furthermore, the mixture was aged at 40° C. after the acylation. Further, low-molecular weight components of the cellulose acylate were removed by washing with acetone.

(Preparation of Cellulose Acylate Solution 201)

The following compositions were introduced into a mixing tank and stirred to dissolve each component, thereby preparing a cellulose acylate solution 201.

| Composition of cellulose acylate solution 201 | |
|---|---|
| Cellulose acetate having a degree of acetyl substitution of 2.88 and a degree of polymerization of 370 | 100.0 parts by mass |
| Hydrophobizing agent 1 (A-1) | 6.5 parts by mass |
| Hydrophobizing agent 2 (B-I) | 4.0 parts by mass |
| Ultraviolet absorber D | 1.5 parts by mass |
| Methylene chloride (first solvent) | 412.2 parts by mass |
| Ethanol (second solvent) | 35.8 parts by mass |

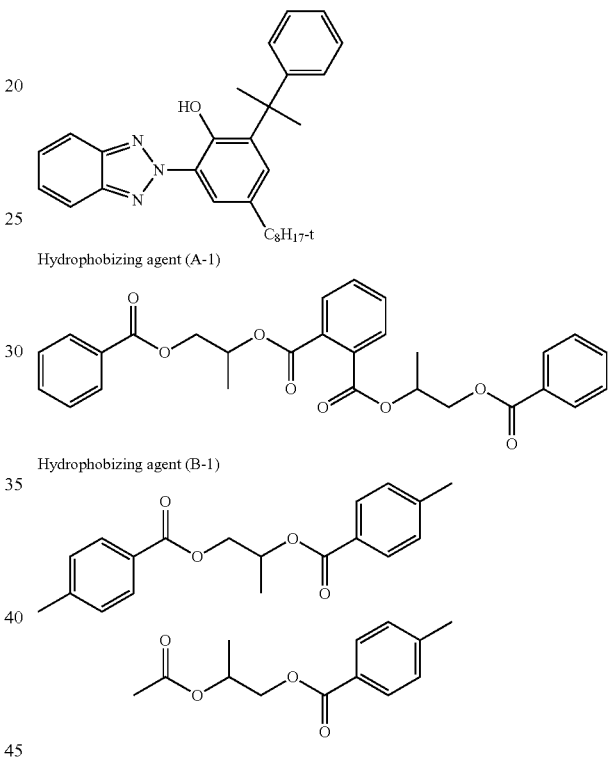

Ultraviolet absorber D

Hydrophobizing agent (A-1)

Hydrophobizing agent (B-1)

(Preparation of Mat Agent Solution 202)

The following compositions were introduced into a disperser and stirred to dissolve each component, thereby preparing a mat agent solution 2.

| Composition of mat agent solution 2 | |
|---|---|
| Silica particle having an average particle size of 20 nm (AEROSIL R972, manufactured by Nippon Aerosil Co., Ltd.) | 2.0 parts by mass |
| Methylene chloride (first solvent) | 79.9 parts by mass |
| Ethanol (second solvent) | 6.9 parts by mass |
| The cellulose acylate solution 201 | 0.9 parts by mass |

(Preparation of Polarizer Durability Enhancer Solution 203)

The following compositions were introduced into a mixing tank and stirred while being stirred to dissolve each component, thereby preparing a polarizer durability enhancer solution 203.

| (Composition of polarizer durability enhancer solution 203) | |
|---|---|
| Polarizer durability enhancer (1-11) | 20.0 parts by mass |
| Methylene chloride (first solvent) | 73.6 parts by mass |
| Ethanol (second solvent) | 6.4 parts by mass |

<Casting>

1.3 parts by mass of the mat agent solution 202 and 3.4 parts by mass of the polarizer durability enhancer solution 203 were each filtered and then mixed by using an in-line mixer, and 95.3 parts by mass of the cellulose acylate solution 201 was added thereto and the mixture was mixed by using an in-line mixer. A band casting device was used to cast the prepared dope on a casting support made of stainless steel (support temperature 22° C.). The film was peeled off in a state where the amount of the remaining solvent in the dope was approximately 20% by mass and dried while being stretched by 1.10 times (10%) at a temperature of 120° C. in the width direction in a state where the amount of the remaining solvent was 5% by mass to 10% by mass while gripping both ends of the film in the width direction with a tenter. Thereafter, the film was conveyed between rolls of a thermal treatment device and further dried to obtain the cellulose acylate film of Example 201. The obtained cellulose acylate film had a thickness of 20 μm and a width of 1480 mm.

Reference Examples 202 to 214

Polarizing plate protective films of Reference Examples 202 to 214 were prepared in the same manner as in Reference Example 201, except that the kind and addition amount of the polarizer durability enhancer and the film thickness in the preparation of the polarizing plate protective film in Reference Example 201 were changed as described in the following Table 2.

TABLE 2

| | Polarizer durability enhancer | | | | | | |
|---|---|---|---|---|---|---|---|
| | Kind | Molecular weight | Number of aromatic rings | Molecular weight/Number of aromatic rings | Number of hydrogen-donating groups capable of forming a hydrogen bond | Addition amount* (parts by mass) | Thickness (μm) |
| Reference example 201 | (1-11) | 348 | 3 | 116 | 3 | 4.0 | 20 |
| Reference example 202 | (1-12) | 302 | 3 | 101 | 1 | 4.0 | 20 |
| Reference example 203 | (1-13) | 406 | 4 | 102 | 1 | 4.0 | 20 |
| Reference example 204 | (1-14) | 302 | 3 | 101 | 1 | 4.0 | 20 |
| Reference example 205 | (1-15) | 330 | 3 | 110 | 1 | 4.0 | 20 |
| Reference example 206 | (1-5) | 511 | 5 | 102 | 1 | 4.0 | 20 |
| Reference example 207 | (2-2) | 232 | 1 | 232 | 1 | 4.0 | 20 |
| Reference example 208 | (1-13) | 406 | 4 | 102 | 1 | 6.0 | 20 |
| Reference example 209 | (1-13) | 406 | 4 | 102 | 1 | 8.0 | 20 |
| Reference example 210 | (1-13) | 406 | 4 | 102 | 1 | 8.0 | 15 |
| Reference example 211 | None | — | — | — | — | 0.0 | 20 |
| Reference example 212 | Plasticizer F | 449 | 4 | 112 | 0 | 4.0 | 20 |
| Reference example 213 | Plasticizer G | 421 | 4 | 105 | 0 | 4.0 | 20 |
| Reference example 214 | Plasticizer H | 304 | 1 | 304 | 1 | 4.0 | 20 |

*represents an addition amount based on 100 parts by mass of cellulose acylate.

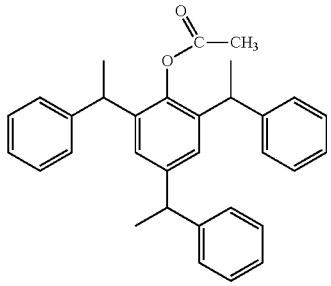

Plasticizer F

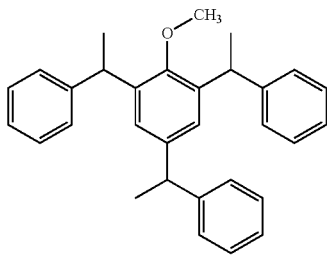

Plasticizer G

TABLE 2-continued

| | | Polarizer durability enhancer | | | | |
|---|---|---|---|---|---|---|
| Kind | Molecular weight | Number of aromatic rings | Molecular weight/Number of aromatic rings | Number of hydrogen-donating groups capable of forming a hydrogen bond | Addition amount* (parts by mass) | Thickness (μm) |

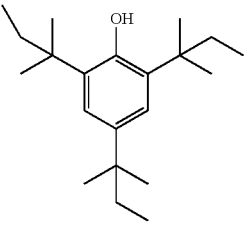

Plasticizer H

Reference Example 301

(Preparation of Acrylic Solution 301)

The following compositions were introduced into a mixing tank and stirred to dissolve each component, thereby preparing an acrylic solution 301.

| Composition of Acrylic Solution 301 | |
|---|---|
| DIANAL BR88 manufactured by Mitsubishi Rayon Co., Ltd. | 100.0 parts by mass |
| Sucrose octabenzoate | 11.0 parts by mass |
| Ultraviolet absorber C | 2.0 parts by mass |
| Polarizer durability enhancer (1-13) | 6.0 parts by mass |
| Methylene chloride (first solvent) | 393.0 parts by mass |
| Methanol (second solvent) | 59.0 parts by mass |

(Preparation of Cellulose Acylate Solution 302)

The following compositions were introduced into a mixing tank and stirred to dissolve each component, thereby preparing a cellulose acylate solution 302.

| Composition of Cellulose Acylate Solution 302 | |
|---|---|
| Cellulose acetate having a degree of acetyl substitution of 2.86 and a degree of polymerization of 350 | 100.0 parts by mass |
| Sucrose octabenzoate | 5.0 parts by mass |
| Ultraviolet absorber C | 2.0 parts by mass |
| Polarizer durability enhancer (1-13) | 8.0 parts by mass |
| Methylene chloride (first solvent) | 414.0 parts by mass |
| Methanol (second solvent) | 62.0 parts by mass |

<Preparation of Stacked Film>

Casting was performed on a metallic support from a side close to the metallic support through a casting die capable of performing a three-layered co-casting, such that a layer configuration of acrylic layer/cellulose acylate layer/acrylic layer=30 μm/10 μm/30 μm was obtained. While present on the metallic support, the dope was dried with a drying wind at 40° C. to form a film, and then the film was peeled off and dried with a drying wind at 105° C. for 5 minutes while fixing both ends of the film with pins to maintain the gap at the same interval. The pins were removed and then the film was dried at 130° C. for further 20 minutes to wind the film in a stacked film state.

From the stacked film thus prepared, upper and lower acrylic films were peeled off and removed to obtain a cellulose acylate film having a thickness of 10 μm.

Reference Examples 302 to 304

Polarizing plate protective films of Reference Examples 302 to 304 were prepared in the same manner as in Reference Example 301, except that the film thickness in the preparation of the polarizing plate protective film of Reference Example 301 was changed into a value described in the following Table 3.

TABLE 3

| Polarizing plate protective film | Film thickness (μm) |
|---|---|
| Reference example 301 | 10 |
| Reference example 302 | 15 |
| Reference example 303 | 6 |
| Reference example 304 | 20 |

Reference Example 401

An acrylic film having a thickness of 180 μm was formed by a method described in Japanese Patent Application Laid-Open No. 2010-058455. Further, the acrylic film was stretched by 1.9 times in the longitudinal direction by heating the film to a temperature of 130° C. In addition, the film as it was supplied to a tenter while holding the position which was 20 mm apart from both ends of the film with a 2-inch clip, and heated to 145° C. to be stretched by 2.2 times, thereby obtaining a polarizing plate protective film 401 having a thickness of 45 μm.

Reference Examples 402 to 404

Polarizing plate protective films of Reference Examples 402 to 404 were prepared in the same manner as in Reference Example 401, except that the thickness of the film at the time of melting and film formation in the preparation of the polarizing plate protective film of Reference Example 401 was changed into a value described in Table 4.

TABLE 4

| Polarizing plate protective film | Film thickness at the time of melting and film formation (μm) | Thickness after stretching (μm) |
|---|---|---|
| Reference example 401 | 180 | 45 |
| Reference example 402 | 90 | 23 |
| Reference example 403 | 50 | 13 |
| Reference example 404 | 40 | 10 |

<Preparation of Polarizer A>

A PVA powder having an average polymerization degree of 2,400 and a saponification degree of 99.9% or more was dissolved in pure water, the aqueous solution was controlled such that the content thereof was 10% by mass, coated on a polyester film, dried at 40° C. for 3 hours, and then further dried at 110° C. for 60 minutes to obtain a PVA film having a thickness of 50 μm. The obtained film was swelled with warm water at 30° C. for 1 minute and immersed in a potassium iodide/iodine (mass ratio 10:1) aqueous solution at 30° C. to be longitudinally uniaxially stretched by 1.5 times. The concentration of the potassium iodide/iodine (mass ratio 10:1) aqueous solution was set to a concentration of 0.38% by mass of iodine. Subsequently, the film was longitudinally uniaxially stretched in a 4.25% boric acid aqueous solution at 50° C. such that the total stretching magnification became 7 times, immersed in a water bath at 30° C., washed with water, and dried at 50° C. for 4 minutes to obtain a Polarizer A having a thickness of 12.5 μm.

<Preparation of Polarizer B>

A PVA powder having an average polymerization degree of 2,400 and a saponification degree of 99.9% or more was dissolved in pure water, the aqueous solution was controlled such that the content thereof was 12% by mass, coated on a polyester film, dried at 40° C. for 3 hours, and then further dried at 110° C. for 60 minutes to obtain a PVA film having a thickness of 50 μm. The obtained film was swelled with warm water at 30° C. for 1 minute and immersed in a potassium iodide/iodine (mass ratio 10:1) aqueous solution at 30° C. to be longitudinally uniaxially stretched by 2 times. The concentration of the potassium iodide/iodine (mass ratio 10:1) aqueous solution was set to a concentration of 0.38% by mass of iodine. Subsequently, the film was longitudinally uniaxially stretched in an aqueous solution of 4.25% mass of boric acid at 50° C. such that the total stretching magnification became 6.5 times, immersed in a water bath at 30° C., washed with water, and dried at 50° C. for 4 minutes to obtain a Polarizer B having a thickness of 16 μm.

<Preparation of Polarizer C>

The Polarizer C was prepared in the same manner as in the Polarizer A, except that the thickness of the PVA film was 32 μm. The Polarizer C had a thickness of 8 μm.

<Preparation of Polarizer D>

The Polarizer D was prepared in the same manner as in the Polarizer A, except that the thickness of the PVA film was 16 μm. The Polarizer D had a thickness of 4 μm.

<Preparation of Polarizer E for Comparison>

The Polarizer E for comparison was prepared in the same manner as in the Polarizer A, except that the thickness of the PVA film was 77 μm. The Polarizer E had a thickness of 19 μm.

Example A-101

[Saponification Treatment of Polarizing Plate Protective Film]

The prepared polarizing plate protective film of Example 101 was immersed in a sodium hydroxide aqueous solution at 2.3 mol/L at 55° C. for 3 minutes. The film was washed with water in a water-washing bath at room temperature and neutralized at 30° C. by using sulfuric acid at 0.05 mol/L. The film was again washed with water in the water-washing bath at room temperature and dried with a warm air at 100° C. The surface of the polarizing plate protective film of Example 101 was subjected to saponification treatment in this manner.

[Preparation of Polarizing Plate]

The surface layer on the air side of the saponification treated polarizing plate protective film of Reference Example 101 was attached to one side of Polarizer A prepared above by using a polyvinyl alcohol-based adhesive. Furthermore, the saponification treated polarizing plate protective film of Reference Example 302 was attached to the opposite side to the surface on which the polarizing plate protective film of Reference Example 101 was adhered by using a polyvinyl alcohol-based adhesive. At this time, the polarizer and the polarizing plate protective films were disposed such that the transmission axis of the polarizer and the width directions of the prepared polarizing plate protective films of Reference Examples 101 and 302 became parallel. A polarizing plate of Example A-101 was prepared in this manner.

[Preparation of Polarizing Plates of Examples A-102 to A-117, B-101 to B-102, C-101 to C-109 and D-101 to D-105 and Comparative Examples A-201 to 209, B-201, C-201, D-201 to D-204 and E-201]

In Example A-101, polarizing plates of Examples and polarizing plates of Comparative Examples were prepared in the same manner as in Example A-101, except that the kind of polarizing plate protective film was changed into the polarizing plate protective film described in Table 5.

Meanwhile, the acrylic film was not subjected to saponification treatment and attached to the polarizer by using an SK adhesion sheet manufactured by Soken Chemical & Engineering Co., Ltd.

(Evaluation of Polarizing Plate Durability)

For each of the above-prepared polarizing plates of Examples and Comparative Examples, the crossed transmittance of the polarizer at a wavelength of 410 nm was measured by the method described in the present specification.

Thereafter, the crossed transmittance was measured in the same manner even in the polarizer after storage for 1000 hours under environments of 60° C. and 95% RH. The variation of the crossed transmittance was obtained before and after the time passage, evaluated in accordance with the following criteria, and the results are described in the following Table 5 by defining the evaluation as the polarizer durability.

A: the change in crossed transmittance at a wavelength of 410 nm was less than 1%

B: the change in crossed transmittance at a wavelength of 410 nm was 1% or more and less than 5%

C: the change in crossed transmittance at a wavelength of 410 nm was 5% or more and less than 10%

D: the change in crossed transmittance at a wavelength of 410 nm was 10% or more

TABLE 5

| | Polarizer | | Polarizing plate protective film | | | | Polarizing plate Thickness (μm) | Polarizer durability Change in crossed transmittance (%) 60° C., 95% and 1000 hours | Display unevenness 60° C., 90% and 48 hours |
|---|---|---|---|---|---|---|---|---|---|
| | | | Side close to liquid crystal cell | | Side far from liquid crystal cell | | | | |
| | Film No. | Film thickness (μm) | Film No. | Film thickness (μm) | Film No. | Film thickness (μm) | | | |
| Example A-101 | Reference example A | 12.5 | Reference example 302 | 15 | Reference example 101 | 30 | 58 | A | B |
| Example A-102 | Reference example A | 12.5 | Reference example 303 | 6 | Reference example 101 | 30 | 49 | A | A |
| ExampleA-103 | Reference example A | 12.5 | Reference example 304 | 20 | Reference example 101 | 30 | 63 | A | B |
| ExampleA-104 | Reference example A | 12.5 | Reference example 301 | 10 | Reference example 101 | 30 | 53 | A | A |
| ExampleA-105 | Reference example A | 12.5 | Reference example 301 | 10 | Reference example 102 | 37 | 60 | A | B |
| ExampleA-106 | Reference example A | 12.5 | Reference example 301 | 10 | Reference example 103 | 30 | 53 | B | A |
| ExampleA-107 | Reference example A | 12.5 | Reference example 301 | 10 | Reference example 104 | 30 | 53 | A | A |
| ExampleA-108 | Reference example A | 12.5 | Reference example 301 | 10 | Reference example 105 | 30 | 53 | A | A |
| ExampleA-109 | Reference example A | 12.5 | Reference example 301 | 10 | Reference example 106 | 30 | 53 | A | A |
| ExampleA-110 | Reference example A | 12.5 | Reference example 301 | 10 | Reference example 107 | 30 | 53 | B | A |
| ExampleA-111 | Reference example A | 12.5 | Reference example 301 | 10 | Reference example 108 | 30 | 53 | B | A |
| ExampleA-112 | Reference example A | 12.5 | Reference example 301 | 10 | Reference example 109 | 30 | 53 | A | A |
| ExampleA-113 | Reference example A | 12.5 | Reference example 301 | 10 | Reference example 110 | 25 | 48 | A | A |
| ExampleA-114 | Reference example A | 12.5 | Reference example 302 | 15 | Reference example 118 | 30 | 58 | A | B |
| ExampleA-115 | Reference exampleA | 12.5 | Reference example 301 | 10 | Reference example 120 | 30 | 53 | A | A |
| ExampleA-116 | Reference exampleA | 12.5 | Reference example 301 | 10 | Reference example 121 | 30 | 53 | A | A |
| ExampleA-117 | Reference example A | 12.5 | Reference example 301 | 10 | Reference example 122 | 30 | 53 | A | A |
| ExampleB-101 | Reference example B | 16 | Reference example 402 | 23 | Reference example 101 | 30 | 69 | A | B |
| ExampleB-102 | Reference example B | 16 | Reference example 404 | 10 | Reference example 101 | 30 | 56 | A | B |
| ExampleC-101 | Reference example C | 8 | Reference example 402 | 23 | Reference example 101 | 30 | 61 | A | B |
| ExampleC-102 | Reference example C | 8 | Reference example 402 | 23 | Reference example 209 | 20 | 51 | A | A |
| ExampleC-103 | Reference example C | 8 | Reference example 403 | 13 | Reference example 101 | 30 | 51 | A | A |
| ExampleC-104 | Reference example C | 8 | Reference example 404 | 10 | Reference example 201 | 20 | 38 | B | A |
| ExampleC-105 | Reference example C | 8 | Reference example 404 | 10 | Reference example 202 | 20 | 38 | B | A |
| ExampleC-106 | Reference example C | 8 | Reference example 404 | 10 | Reference example 203 | 20 | 38 | B | A |
| ExampleC-107 | Reference example C | 8 | Reference example 404 | 10 | Reference example 204 | 20 | 38 | B | A |
| ExampleC-108 | Reference example C | 8 | Reference example 404 | 10 | Reference example 205 | 20 | 38 | B | A |
| ExampleC-109 | Reference example C | 8 | Reference example 404 | 10 | Reference example 206 | 20 | 38 | B | A |
| ExampleD-101 | Reference example D | 4 | Reference example 404 | 10 | Reference example 207 | 20 | 34 | B | A |
| ExampleD-102 | Reference example D | 4 | Reference example 404 | 10 | Reference example 208 | 20 | 34 | A | A |
| ExampleD-103 | Reference example D | 4 | Reference example 404 | 10 | Reference example 209 | 20 | 34 | A | A |
| ExampleD-104 | Reference example D | 4 | Reference example 404 | 10 | Reference example 210 | 15 | 29 | B | A |
| ExampleD-105 | Reference example D | 4 | Reference example 303 | 6 | Reference example 404 | 10 | 20 | B | A |
| Comparative exampleA-201 | Reference example A | 12.5 | Reference example 404 | 10 | Reference example 112 | 45 | 68 | A | C |

TABLE 5-continued

| | Polarizer | | Polarizing plate protective film | | | | Polarizing | Polarizer durability Change in crossed transmittance (%) 60° C., 95% and 1000 hours | Display unevenness 60° C., 90% and 48 hours |
| | | | Side close to liquid crystal cell | | Side far from liquid crystal cell | | | | |
| | Film No. | Film thickness (μm) | Film No. | Film thickness (μm) | Film No. | Film thickness (μm) | plate Thickness (μm) | | |
|---|---|---|---|---|---|---|---|---|---|
| Comparative exampleA-202 | Reference example A | 12.5 | Reference example 401 | 45 | Reference example 101 | 30 | 88 | A | C |
| Comparative exampleA-203 | Reference example C | 8 | Reference example 402 | 23 | Reference example 111 | 30 | 61 | C | B |
| Comparative exampleA-204 | Reference example C | 8 | Reference example 402 | 23 | Reference example 113 | 30 | 61 | C | B |
| Comparative exampleA-205 | Reference example C | 8 | Reference example 402 | 23 | Reference example 114 | 30 | 61 | C | B |
| Comparative exampleA-206 | Reference example C | 8 | Reference example 402 | 23 | Reference example 115 | 30 | 61 | C | B |
| Comparative exampleA-207 | Reference example C | 8 | Reference example 402 | 23 | Reference example 116 | 30 | 61 | C | B |
| Comparative exampleA-208 | Reference example C | 8 | Reference example 402 | 23 | Reference example 117 | 30 | 61 | C | B |
| Comparative exampleA-209 | Reference example A | 12.5 | Reference example 302 | 15 | Reference example 119 | 30 | 58 | A | C |
| Comparative exampleB-201 | Reference example B | 16 | Reference example 101 | 30 | Reference example 101 | 30 | 76 | A | C |
| Comparative exampleC-201 | Reference example C | 8 | Reference example 401 | 45 | Reference example 101 | 30 | 83 | A | C |
| Comparative exampleD-201 | Reference example D | 4 | Reference example 404 | 10 | Reference example 211 | 20 | 34 | D | A |
| Comparative exampleD-202 | Reference example D | 4 | Reference example 404 | 10 | Reference example 212 | 20 | 34 | D | A |
| Comparative exampleD-203 | Reference example D | 4 | Reference example 404 | 10 | Reference example 213 | 20 | 34 | D | A |
| Comparative exampleD-204 | Reference example D | 4 | Reference example 404 | 10 | Reference example 214 | 20 | 34 | D | A |
| Comparative exampleE-201 | Reference example E | 19 | Reference example 404 | 10 | Reference example 101 | 30 | 59 | A | C |

As clearly shown from the results in Table 5, it can be known that the polarizing plate (Examples A-101 to D-105) with a thickness as defined in claim 1 using the polarizing plate protective film of the present invention with a thickness as defined in claim 1 which satisfies the polarizer thickness as defined in claim 1 and has the polarizer durability enhancer preferably has a smaller change in crossed transmittance at 410 nm before and after the time passage of 1000 hours at 60° C. and 95% RH than the polarizing plates of Comparative Examples.

Example 501

[Preparation of Liquid Crystal Display Device]

Two polarizing plates of a commercially available liquid crystal television (BRAVIA J5000 from SONY CORPORATION) were peeled off, and the polarizing plates A-101 of the present invention were attached to the observer side and the backlight side one by one through an adhesive, such that each polarizing plate protective film shown as a side close to the liquid crystal cell in Table 5 became a liquid crystal cell side on the viewer side and the backlight side. The cross-nicol arrangement was applied, such that the transmission axis of the polarizing plate on the observer side and the transmission axis of the polarizing plate on the backlight side became a vertical direction and a horizontal direction, respectively.

The other polarizing plates in Table 5 were attached to the observer side and the backlight side one by one through an adhesive in the same manner, such that the polarizing plate protective films shown as a side close to the liquid crystal cell in Table 5 each became the liquid crystal cell side.

(Evaluation of Display Unevenness)

The liquid crystal display device of the present invention as prepared above was evaluated on the display unevenness of the panel after storage at 60° C. and 90% for 72 hours in accordance with the following criteria for a commercially available liquid crystal television, and the results are shown in Table 5.

A: No unevenness
B: The area of unevenness was less than 10%
C: The area of the generation of unevenness was 10% or more As clearly shown from the results in Table 5, it can be known that it is difficult to generate display unevenness even when a liquid crystal display device using the polarizing plate of the present invention is used under high temperature and high humidity environments, which is preferred.

What is claimed is:

1. A polarizing plate comprising: two protective films; and a polarizer provided between the two protective films, wherein (1) the polarizer has a thickness of 3 μm to 18 μm, (2) at least one of the protective films has a thickness of 3 μm to 40 μm and comprises at least one resin and a compound having at least one hydrogen-donating group capable of forming a hydrogen bond and a ratio of molecular weight to number of aromatic rings of 300 or less in an amount of 1 part by mass to 20 parts by mass based on 100 parts by mass of the resin, and (3) the polarizing plate has a thickness of 15 μm to 70 μm,
wherein the compound having at least one hydrogen-donating group capable of forming a hydrogen bond and a ratio of molecular weight to number of aromatic rings of 300 or less is a compound represented by the following Formula (1):

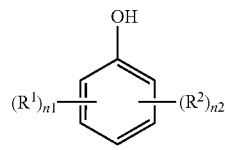
(1)

wherein, in the Formula (1), $R^1$ represents a hydrogen atom or a substituent, and $R^2$ represents a substituent represented by the following Formula (1-2'); n1 represents an integer of 0 to 4, and each $R^1$ is same as or different from every other $R^1$ when n1 is 2 or higher; and n2 represents an integer of 1 to 5, and each $R^2$ is same as or different from every other $R^2$ when n2 is 2 or higher:

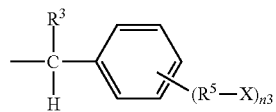
(1-2')

wherein in the Formula (1-2'), $R^3$ represents a hydrogen atom, an alkyl group having 1 to 5 carbon atoms or a substituent represented by the following Formula (1-3); $R^5$ represents a single bond or an alkylene group having 1 to 5 carbon atoms; X represents a substituted or unsubstituted aromatic ring; and n3 represents an integer of 0 to 5, and each of $R^5$ and X is same as or different from every other $R^5$ and X when n3 is 2 or higher:

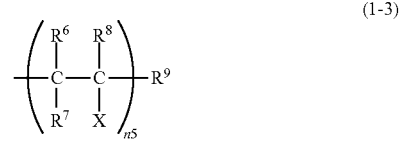
(1-3)

wherein, in the Formula (1-3), X represents a substituted or unsubstituted aromatic ring;
each of $R^6$, $R^7$, $R^8$ and $R^9$ independently represents a hydrogen atom or an alkyl group having 1 to 5 carbon atoms; and n5 represents an integer of 1 to 11, and each of $R^6$, $R^7$, $R^8$ and $R^9$ and X is same as or different from every other $R^6$, $R^7$, $R^8$ and $R^9$ and X when n5 is 2 or higher.

2. The polarizing plate of claim 1, wherein the resin contained in the protective film is cellulose acylate.

3. The polarizing plate of claim 1, wherein one of the two protective films has a thickness of 3 μm to 40 μm and comprises at least one resin and a compound having at least one hydrogen-donating group capable of forming a hydrogen bond and a ratio of molecular weight to number of aromatic rings of 300 or less in an amount of 1 part by mass to 20 parts by mass based on 100 parts by mass of the resin, and other of the two protective films comprises an acrylic resin.

4. A liquid crystal display device comprising a liquid crystal cell and at least one polarizing plate which is the polarizing plate of claim 1.

* * * * *